(12) United States Patent
Zhao et al.

(10) Patent No.: US 10,218,994 B2
(45) Date of Patent: Feb. 26, 2019

(54) WATERMARK RECOVERY USING AUDIO AND VIDEO WATERMARKING

(71) Applicant: Verance Corporation, San Diego, CA (US)

(72) Inventors: Jian Zhao, San Diego, CA (US); Rade Petrovic, San Diego, CA (US); Joseph M. Winograd, San Diego, CA (US)

(73) Assignee: Verance Corporation, San Diego, CA (US)

( * ) Notice: Subject to any disclaimer, the term of this patent is extended or adjusted under 35 U.S.C. 154(b) by 0 days.

(21) Appl. No.: 15/571,022

(22) PCT Filed: May 2, 2016

(86) PCT No.: PCT/US2016/030453
§ 371 (c)(1),
(2) Date: Oct. 31, 2017

(87) PCT Pub. No.: WO2016/179110
PCT Pub. Date: Nov. 10, 2016

(65) Prior Publication Data
US 2018/0167630 A1 Jun. 14, 2018

Related U.S. Application Data

(60) Provisional application No. 62/166,638, filed on May 26, 2015, provisional application No. 62/156,137, filed on May 1, 2015.

(51) Int. Cl.
*H04N 19/467* (2014.01)
*H04N 21/8358* (2011.01)
(Continued)

(52) U.S. Cl.
CPC ......... *H04N 19/467* (2014.11); *G06T 1/0092* (2013.01); *H04N 19/124* (2014.11); *H04N 19/48* (2014.11); *H04N 19/625* (2014.11); *H04N 21/44008* (2013.01); *H04N 21/4622* (2013.01); *H04N 21/8358* (2013.01); *G06T 2201/0051* (2013.01); *G06T 2201/0065* (2013.01)

(58) Field of Classification Search
CPC .... H04N 19/467; H04N 19/124; H04N 19/48; H04N 19/625; H04N 21/44008; H04N 21/4622
See application file for complete search history.

(56) References Cited

U.S. PATENT DOCUMENTS

| 7,515,731 B2 * | 4/2009 | Koto | G06T 1/0028 382/100 |
|---|---|---|---|
| 2007/0092103 A1 * | 4/2007 | Mihcak | G06T 1/0028 382/100 |

* cited by examiner

*Primary Examiner* — Mishawn N Hunter
(74) *Attorney, Agent, or Firm* — Perkins Coie LLP; Donald L. Wenskay

(57) ABSTRACT

The disclosed embodiments relate to automatic content recognition and recovery of metadata associated with multimedia content. Embodiments include the use of audio watermarks, video watermarks or both to recover metadata. Embodiments also describe improved video watermark embedding techniques including quantization-based video watermarking in the spatial domain and quantization-based video watermarking in frequency domain, as well as improved video watermark detection techniques based on multiple video frames. Embodiments also include improvements to payload structure and improvements to payload recovery.

39 Claims, 11 Drawing Sheets

(51) Int. Cl.
*H04N 21/44* (2011.01)
*H04N 21/462* (2011.01)
*H04N 19/48* (2014.01)
*H04N 19/124* (2014.01)
*H04N 19/625* (2014.01)
*G06T 1/00* (2006.01)

WATERMARK RECOVERY USING AUDIO AND VIDEO WATERMARKING

CROSS REFERENCE TO RELATED APPLICATIONS

This patent application claims the benefit of the U.S. Provisional Patent Application No. 62/156,137, filed May 1, 2015, and the U.S. Provisional Patent Application No. 62/166,638, filed May 26, 2015. The entire content of the before-mentioned patent application is incorporated by reference as part of the disclosure of this application.

FIELD OF INVENTION

The present invention generally relates to the field of automatic content recognition. More particularly, the disclosed embodiments relate to the recovery of information associated with multimedia content using watermarking techniques.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content. A multimedia content, such as an audiovisual content, can include a series of related images, which when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, and other sources In some scenarios, such a multimedia content, or portions thereof, may contain only one type of content, including, but not limited to, a still image, a video sequence or an audio clip, while in other scenarios, the multimedia content, or portions thereof, may contain two or more types of content such as audiovisual content and a wide range of metadata. One technique for identifying a content uses watermarks that are embedded into a multimedia content (e.g., in the audio or video portions). The watermarks carry information that can be used for automatic content recognition (ACR).

SUMMARY OF CERTAIN EMBODIMENTS

The disclosed embodiments relate to automatic content recognition and recovery of metadata associated with multimedia content. Embodiments include the use of audio watermarks, video watermarks, or both to recover metadata. Various embodiments handle different scenarios involving responses to situations where an audio watermark, or a video watermark, or both, are recovered. Embodiments also disclose improved video watermarking techniques including Quantization-based video watermarking in the spatial domain and in the DCT domain, as well as improved video watermark detection techniques based on multiple view frames. Embodiments also include improvements to payload structure and improvements to payload recovery. In some embodiments, a video watermark is detected in content using a detector having at least two states, extraction and confirmation. In this embodiment, prior to attempting to extract payload from the video watermark and prior to confirming a payload presence, a determination can be made regarding whether a watermark is present or not. If it is determined that a watermark is present, a candidate bit pattern can be formed and the video watermark payload is extracted using a Forward Error Correction decoder.

One aspect of the disclosed technology relates to a method for detection of a video watermark from a multimedia content that includes obtaining, at a watermark extractor that is implemented at least partially in hardware, one or more blocks of sample values representing image pixels in a video frame, where each block includes one or more rows of pixel values and one or more columns of pixel values. This method further includes using the watermark extractor to extract one or more video watermarks from the one or more blocks. Watermark extraction for each block includes (a) determining a weighted sum of the pixel values in the block produced by multiplying each pixel value with a particular weight coefficient and summing the result together, where the particular weight coefficients for each block are selected to at least partially compensate for degradation of video watermark or watermarks in each block due to impairments caused by transmission or processing of the multimedia content. Watermark extraction for each block also includes (b) comparing the weighted sum of the pixel values to one or more predetermined threshold values, (c) upon a determination that the weighted sum falls within a first range of the one or more predetermined threshold values, identifying a detected watermark symbol having a first value, and (d) upon a determination that the weighted sum falls within a second range of the one or more predetermined threshold values, identifying a detected watermark symbol having a second value. The above noted method additionally includes repeating operations (a) through (d) for a plurality of the one or more blocks to obtain a plurality of the detected watermark symbol values, and determining whether or not the plurality of the detected watermark symbols values form a valid watermark payload.

Another aspect of the disclosed technology relates to a method for detecting of a video watermark from a multimedia content that includes obtaining a first content segment from a first video frame at a watermark extractor that is implemented at least partially in hardware, and entering an extraction state for determining whether or not one or more watermarks can be extracted from the first content segment. Determining whether or not the one or more watermarks can be extracted from the first content segment includes conducting watermark extraction operations to determine whether or not a first watermark payload can be extracted, and upon a determination that the first watermark payload is extracted, entering a confirmation state for confirming a detection of a second watermark from a second content segment located within a second video frame. Confirming the detection of the second watermark includes processing the second content segment to obtain a set of candidate payload symbols, and determining whether or not the set of candidate payload symbols match an expected set of payload symbols with less than a predetermined number of mismatches. The expected set of payload symbols can be a predicted sequence of payload symbols that are formed based on the first watermark payload. Confirming the detection of the second watermark further includes upon a determination that the set of candidate payload symbols match the expected set of payload symbols with less than a predetermined number of mismatches, producing an indication that a payload of the second watermark has been detected.

Other aspects of the disclosed technology relates to devices and computer program products that implement the above described techniques. Further aspects of the disclosed technology are described in further detail in the sections that follow.

DETAILED DESCRIPTION OF CERTAIN EMBODIMENTS

Figure 1:
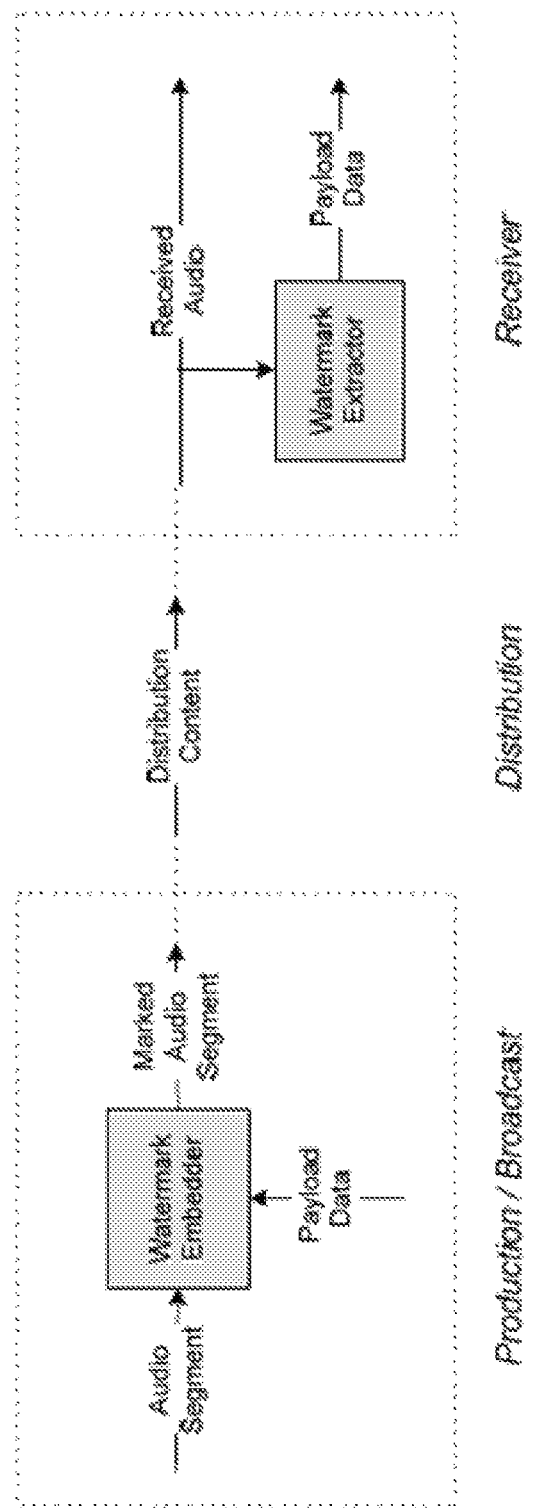
FIG. 1 illustrates an exemplary diagram for embedding, distribution, reception and detection of a multimedia content that includes watermarks.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

The disclosed embodiments are described in the context of automatic content recognition (ACR) and recovery of metadata associated with multimedia content. The disclosed techniques can, for example, be applicable to the watermarking system that is compatible with the requirements of the Advanced Television Systems Committee (ATSC), Inc., Call for Proposals For ATSC-3.0 AUTOMATIC CONTENT RECOGNITION WATERMARKING SOLUTIONS—ATSC Technology Group 3 (ATSC 3.0) ("ATSC RfP"), which is incorporated herein by reference. ATSC Video Watermark emission specification (http://atsc.org/candidate-standard/a335-atsc-candidate-standard-video-watermark-emission/), which is also part of the above noted U.S. Provisional Patent Application No. 62/156,137, is also incorporated herein by reference.

Metadata Recovery: Some aspects of the disclosed embodiments enable the recovery of metadata associated with a multimedia content using audio watermarks, video watermarks, or both.

The multimedia content sometimes includes metadata that can enable advanced features (e.g., interactivity and dynamic ads) in a client application that runs on a particular device (e.g., a TV, a tablet, etc.). The use of watermarks allows the recovery of such metadata (and thus the associated advanced features) even when the metadata is lost, e.g., after redistribution of the multimedia content by a multichannel video program distributor (MVPD). For example, when the multimedia content is provided by a set top box to a television set through an HDMI interface, the metadata, which is often carried as a separate or multiplexed data stream, is not delivered to the client device. In these scenarios, ACR through the used of watermarks that are embedded in the multimedia content can be used to recover the metadata (e.g., timed metadata) from the content after redistribution to enable the delivery of advanced features. Metadata recovery can be carried out by extracting the payload of one or more watermarks, and using the extracted payload to contact an appropriate metadata server that contains the appropriate metadata, and/or enables the recovery of advanced features associated with the metadata. In some scenarios, the watermark payload includes timing information that can be used to identify the temporal location of the watermark within the host multimedia content. Such timing information enables the delivery of appropriate advanced features that are associated with specific segments of the multimedia content.

FIG. 1 illustrates an exemplary diagram for embedding, distribution, reception and detection of a multimedia content that includes watermarks. For simplicity, FIG. 1 only shows the processing path for audio watermarks but it is understood that the same or similar components may be used for embedding and detection of video watermarks. As shown in FIG. 1, an audio segment is embedded with watermarks having a particular watermark payload. The host audio content is delivered either separately or as part of a multi-component multimedia content to a Receiver. The received content may include impairments due to different noise and error-producing mechanisms in the distribution channel or due to intentional processing of the content. The received audio is subject to watermark extraction (sometime also referred to as watermark detection) to obtain the embedded watermark payloads.

The audio watermark is co-resident with audio energy in a region of the audio frequency spectrum containing perceptually important components and is therefore retained through audio distribution paths. It employs a modulation and encoding scheme which is resilient to most types of audio processing, including modern techniques for lossy signal compression. It also includes error detection and correction capabilities. Together, these and other features of the watermarking system provide a reliable auxiliary channel for delivery of a data payload to accompany audio and audiovisual content through environments employing heterogeneous audiovisual formats, protocols, and interfaces.

Both audio and video watermarking techniques can be used to identify the content and the current temporal position of the content that is being presented or rendered in order to recover the timed metadata. There are certain advantages and disadvantage associated with the use of each audio and video watermarking techniques for metadata recovery. For example, in some circumstances, audio may not be available to the client device (e.g., during audio rendering by A/V receivers or amplifier, during audio muting associated with presentation of electronic program guide (EPG) or picture-in-picture (PiP) presentations), and thus ACR according to video-based watermarks should be used for metadata recovery. On the other hand, video watermarking often requires more computational resources, such as CPU cycles and memory usage, than audio watermarking for watermark embedding and detection. Moreover, audio watermarks may be more robust than video watermarks after watermarked content is transcoded using certain techniques, and thus content may be identified faster and more reliably using audio watermarks. In some transcoding scenarios, however, video watermarks may prove to be more reliable. Audio watermarks may also provide better precision in identifying the temporal position of the content that is being viewed, and audio watermarks may more accurately identify the boundaries of a content segment compared to video watermarks.

It is therefore important to have the ability to use either or both video and audio watermarks to improve the recovery of lost metadata. In some embodiments of the present application, a client that is equipped with both an audio and a video watermark extractor, upon a failure to receive any one content component of the multimedia content (e.g., the audio or video component), performs watermark detection using the received content component only. In another embodiment, the multimedia content contains audio watermarks, video watermarks, or both. If both watermarks are embedded in the multimedia content, ideally they carry the identical and synchronized payloads. A client device that is capable of detecting both audio and video watermarks may detect both watermarks in parallel. Once a watermark is detected from one content component (e.g., audio or video), the client device may implement the following procedures associated with different scenarios.

Scenario (A): Initiate the metadata recovery process using the payload of the detected watermark, and continue to perform watermark detection using the content component (e.g., video or audio component) from which the watermark was detected. In this scenario, watermark detection from the other content component is discontinued for the content segment. For example, if the watermark was detected from an audio component of the content, the client device stops watermark detection from the video component.

Scenario (B): Initiate the metadata recovery process using the payload of the detected watermark, ignore the same payload, if extracted, from other content components, and continue to perform watermark detection from both content components in parallel. The client device may decide to stop watermark detection from a content component where no watermarks can be detected after a predetermined period of time.

Scenario (C): Wait for the detection of the same watermark from the other component and compare the payloads carried in both detected watermarks. If both payloads are identical, the client device can initiate the metadata recovery process and continue watermark detection from both content components. If no watermark is detected from the other component after a predetermined period of time, the client may decide to use the detected payload (from only one component) to initiate the metadata recovery process. The client may decide to stop watermark detection from a content component where no watermark detection after a fixed period of time.

In some scenarios where the multimedia content includes both audio and video watermarks, audio and video watermarks may carry different payloads for the same content segment. For example, audio watermarks can be embedded by a business entity (e.g., a broadcast network or program producer) and video watermarks can be embedded by another entity (e.g., a local TV station). The embedding of watermarks with different payloads may be needed to convey different information, to accommodate different watermark embedding schemes, or to provide a better temporal resolution with a second payload compared to the first payload. In yet another example scenario, one watermark (e.g., audio or video watermark) can be used to recover metadata associated with one application (e.g., interactivity) while the other watermark is used to recover the metadata associated with another application (e.g., dynamic advertising). It is thus evident that the detection of both watermark payloads can enable a more precise determination of content's temporal location or expand the client's ability to benefit from extra features or services.

In many applications, metadata recovery is initiated when a client sends a query to a metadata server. The query can indicate to the server whether audio watermark, video watermark or both audio and video watermarks were used to trigger such a query. This indication can be included in the query as part of the watermark payload, or as a separate parameter of the query. When the query is triggered by both audio and video marks, then the metadata associated with both watermarks may be returned to the client. Moreover, the recovered metadata may include additional information that instructs the client device to perform various actions. For example, if the metadata is recovered using an audio watermark, the recovered metadata may instruct the client device to continue the detection of watermarks using the video component because certain broadcast services are only activated once the video watermark is detected. In another example, the recovered metadata may instruct the client device that watermark detection from either an audio or a video component is preferred for the current watermarked content segment.

In some embodiments, a method for recovering metadata in content having both audio and video watermarks can include receiving content having both an audio component having audio watermarks and a video component having video watermarks and determining if one of the audio or video watermarks are not received. If one of the audio or video watermarks are not received, performing watermark detection on the other component. In such embodiments, the audio and video watermarks contain identical and synchronized payloads. Such a method for metadata recovery can further included detecting both the audio and video watermarks in parallel in a client. The method can further include, if a watermark is detected from one content component, making a decision from one of the following: (a) initiate metadata recovery process using the payload carried in the detected watermark and continue to perform watermark detection only from the component having the detected payload and stopping watermark detection from the other content component; (b) initiate metadata recovery process using the payload carried in the detected watermark detected, and ignore the same payload if extracted from the other content component and continue to perform watermark detection from both content components in parallel; or (c) wait for detection of a watermark from the other component and compare the payloads carried in both detected watermarks. In some embodiments, the audio and video watermarks carry different payloads for the same content segment. For example, the audio and video watermarks are embedded by different business entities. In one example embodiment, the audio watermark is used to recover metadata associated with one application and the video watermark is used to recover metadata associated with another application.

Video Watermarking Techniques: The disclosed video watermarking technologies embed a payload for metadata recovery into each video frame and are preferably detectable from each frame or several continuous frames. The technology supports real-time embedding and detection of watermarks with minimal resources, such as CPU processing and memory, and can be implemented in the content's broadcast chain, and in the client device (such as a TV receiver). In the sections that follow two quantization-based video watermarking techniques are described. One of the disclosed techniques is suitable for embedding and extraction of watermarks in the spatial domain and the other in the DCT domain.

It should be noted that in describing the watermarking techniques in the sections below certain exemplary values are used to facilitate the understanding of the disclosed technology. It is, however, understood that these exemplary values (e.g., range values, block sizes, video resolutions, scaling factors, etc.) can be modified within the scope of the present application to customize the embedding or detection operations as deemed suitable for a particular device or a particular application, or to accommodate different robustness, transparency or computational complexities that may be required for implementation of the watermarking systems.

Quantization-Based Video Watermarking: In Spatial Domain: In this technique, a set of continuous pixels in either one dimension (i.e., horizontal or vertical dimension) or two dimensions of a video frame is selected to be modified to embed a watermark symbol.

Watermark Embedding Procedure: In one embodiment, to embed a watermark symbol value, the luminance and/or chrominance value ("luma/chroma values") of each and every selected pixel used to carry a symbol value is modified to be within one of a pre-defined value ranges. A value range R(L,M,H) is represented by a low value (L) (e.g., luminance value 0), a high value (H) (e.g., luminance value 16), and a midrange value (M) (which is obtained by dividing (H+L) by 2). These value ranges are non-overlapping, i.e., a value between the low value and the high value of a value range cannot be a value between the low value and the high value of another value range.

Figure 2:
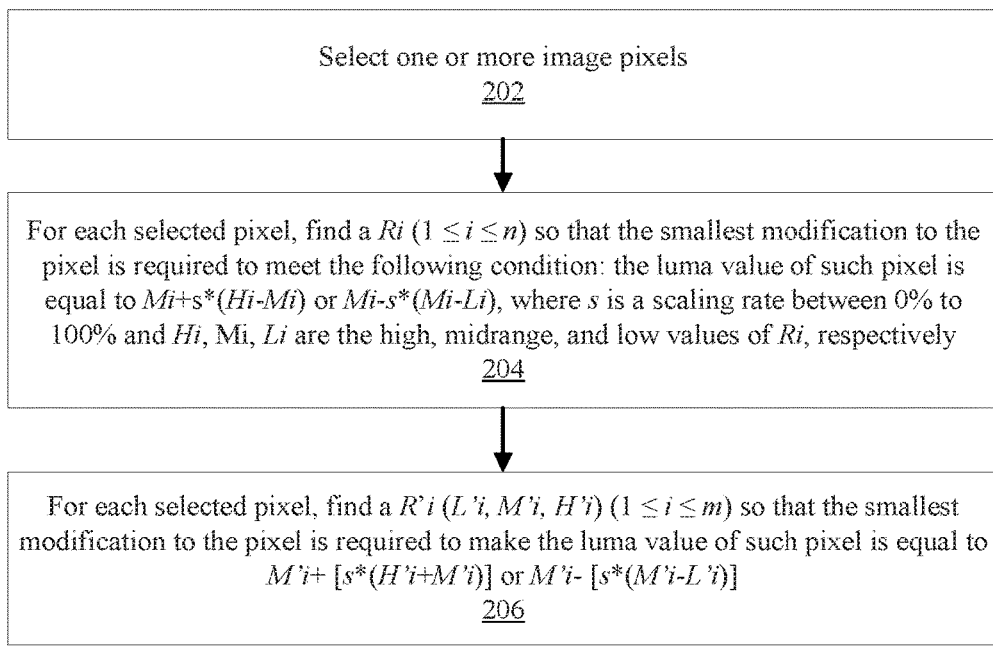
FIG. 2 illustrates operations for embedding one or more pixels of a selected block within a video frame in accordance with an exemplary embodiment.

The watermarking process can include the following. Assume $\{R1, R2, \ldots Rn\}$ is the pre-defined value ranges for the value v of the watermark symbol, where n in an integer that denotes the highest value range. For example, Rn reaches the maximum luma value based on the bit depth (e.g., for 8-bit representation of a luma, the high value of Rn can't exceed 255. In the watermarking embedding technique, the larger n implicitly indicates less robustness and better transparency. FIG. 2 illustrates exemplary operations for embedding the pixels used to carry a symbol value. After the image pixels are selected (202), for each and every selected pixel, find a Ri ($1 \leq i \leq n$) so that the smallest modification to the pixel is required to meet the following condition: the luma value of such pixel is equal to Mi+[s*(Hi−Mi)] or Mi−[s*(Mi−Li)], where s is a scaling rate between 0% to 100% and Hi, Mi, Li are the high, midrange, and low values of Ri, respectively (204). In other words, a larger modification to the pixel is required to meet the above condition for any other Rj ($i \neq j$ and $1 \leq j \leq n$). The scaling rate adjusts the watermark strength: the larger the scaling value (s), the more robust is the watermark carrying the symbol. It should be noted that in the above discussion, and throughout this document, the asterisks symbol is used to denote multiplication.

Assume $\{R'1, R'2, \ldots R'm\}$ are the pre-defined value ranges for another value v' (where $v' \neq v$) of the watermark symbol and there is no overlap between any R'i ($1 \leq i \leq m$) and any R'j ($1 \leq j \leq m$) where m is the number of value ranges for the symbol value v'. For each and every selected pixel carrying the symbol value v', find a R'i (L'i, M'i, H'i) ($1 \leq i \leq m$) so that the smallest modification to the pixel is required to make the luma value of such pixel is equal to M'i+[s*(H'i+M'i)] or M'i−[s*(M'i−L'i)] (206).

When the above embedding procedure is used, a watermark symbol value v or v' is detected if the luma value of a pixel falls within any Ri ($1 \leq i \leq n$) or any R'j ($1 \leq j \leq m$), respectively.

A set of pixels is selected from a block of pixels in a video frame. A block of pixels for watermark ("watermark block") consists of one or more continuous rows and one or more continuous columns. As an example, a 8×2 block with 8 columns and 2 rows contains 16 pixels. For a video frame with a resolution 1920×1080, there are 240 blocks with 8×2 blocks for the top 2 lines of a video frame.

For a binary watermark symbol, the exemplary value ranges are defined for 8-bit luminance value of each selected pixel as follows. Note that R1 ... R4 are value ranges for the watermark symbol value "0", and R'1 ... R'4 are value ranges for the watermark symbol value "1".

R1=(240, 248, 255) R'1=(208.224.239)
R2=(176,192,207) R'2=(144,160,175)
R3=(112,128,143) R'3=(80,96,111)
R4=(48,64,79) R'4=(16,32,47).

In one embodiment, instead of requiring the luma value of each selected pixel to be equal to the midrange of a value range, a statistical value such as sum, difference, deviation, and/or histogram of luma and/or chroma values of the selected pixels in a block is required to be equal to the midrange of a value range. A simple modification strategy to meet the conditions is to linearly scale down or up the luma values of the selected pixels to make a statistical value of these values to reach within Ri. For example, assume that the watermark block contains 8 pixel, and the ranges R1=(0, 512,1024) and R2=(1025,1537,2048) are defined for the watermark symbol value "0". If the sum of the luminance values of the 8 pixels is equal to 320, R1 is selected because the distance between 320 and the midrange of R1 is smaller than the distance between 320 and the midrange of R2. The luminance values of the 8 pixels are modified to bring the sum of these values to reach 512. A simpler strategy is to add 24 to the luminance value of each of the 8 pixels. Alternatively, the luma of each pixel is increased proportionally, i.e., replacing the luma value of each pixel to a round integer of li*(1+192/512), where li is the original luma of the pixel i ($0 \leq i \leq 7$).

In some implementations, more sophisticated human visual system models can be used to optimize the modification of the values of the selected pixels.

A variant of the disclosed quantization-based video marking in spatial domain employs a single luminance value range R(L,M,H) where a watermark symbol value '0' or '1' is embedded if the luminance value of each pixel in one or more blocks is set to the high (H) or the low value (L), respectively.

Figure 3:
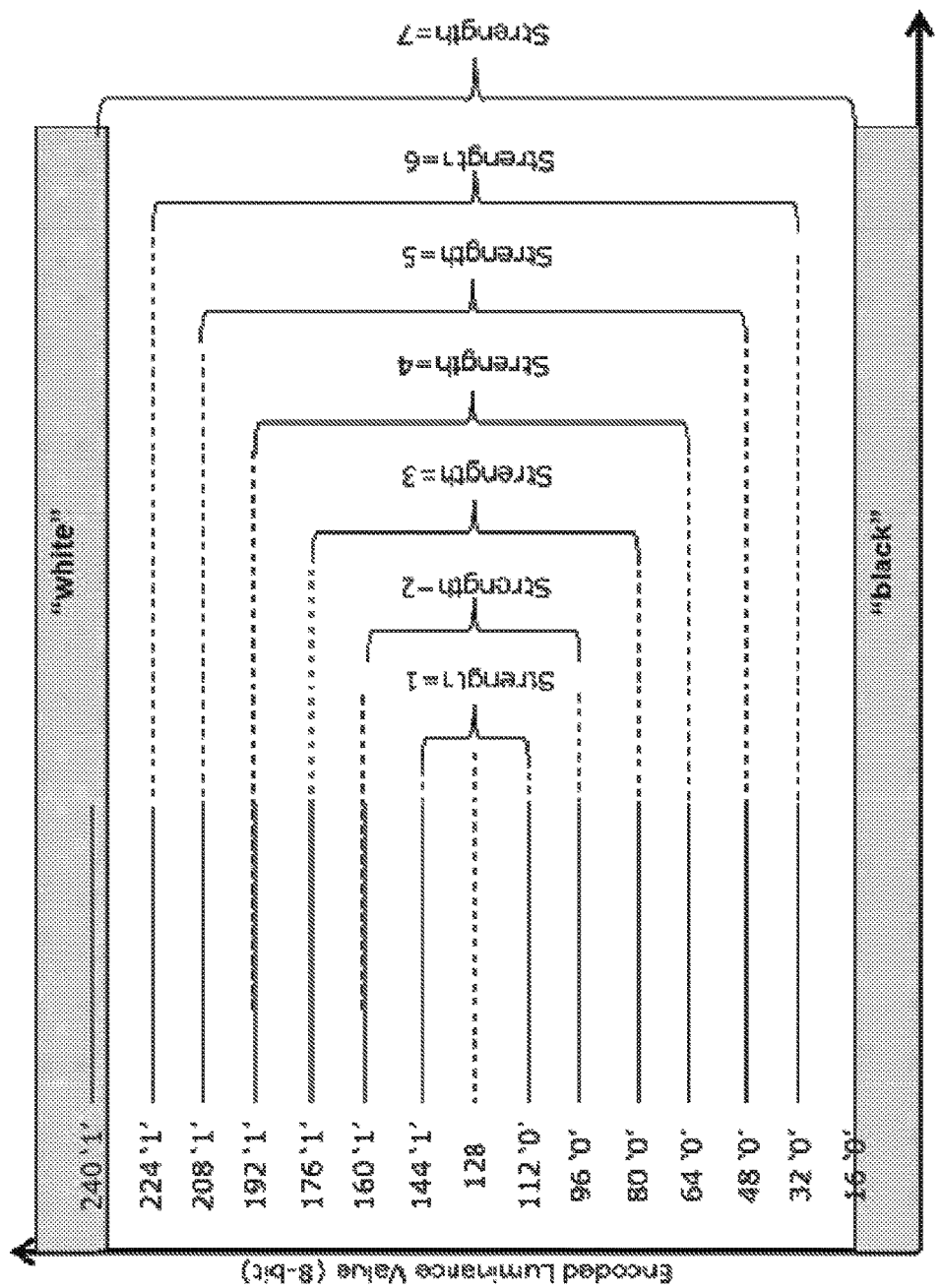
FIG. 3 illustrates a graph of watermark encoding levels based on a single luminance range in accordance with an exemplary embodiment.

FIG. 3 shows a graph of watermark encoding based on single luminance range, where a single value range is used for a specified robustness value. In contrast, as described earlier, in a multiple value ranges system, a watermark symbol can be embedded by modifying the luma of a block to the closest one of the value ranges dedicated to this value of the watermark symbol. For a video frame with 8-bit luminance value from 0 to 255, FIG. 3 shows the corresponding 7 value ranges, where each range represents a different watermark encoding strength (from 1 to 7), resulting in 7 different robustness levels. As an example, for an 8×2 block and the watermarking strength 1, the luminance value of each pixel (of 16 pixels in a block) is set to 144 or 112 if the symbol value '1' or '0' is embedded in such a block, respectively. For different horizontal resolutions of video frames other than 1920, the following steps can be performed to embed watermarks: 1) first scale the video frames or the area of the video frames that to be embedded with watermark symbols to 1920×1080; 2) then perform watermark encoding; and 3) finally scale back to the original resolution.

For a different bit depth of luma value other than 8 bits, the quantization step size can be scaled proportionally according to the bit depth for watermark embedding. In particular, assume that the bit depth of the luminance value is d, then quantization step size Q and Ri(Li,M,Hi) value range for a watermark encoding strength i (1≤i≤7) can be calculated as follows:

$Q=(2^d)/16$ $M=(2^d)/2$ $Hi=M+(i*Q)$ $Li=M-(i*Q)$.

It should be noted that in the above description of watermark encoding based on single luminance range, i represents embedding strength as can be seen from the exemplary diagram of FIG. 3. In some implementations, the degradation caused by impairments such as lossy video encoding or frame rate change can be predictable. Thus, watermark strength may be selected for each pixel, each symbol or each video frame based on such predication.

Watermark Detection Procedure: For a watermark symbol value that can be embedded with multiple value ranges, a watermark symbol value v or v' is detected if the detected average value of the luma/chroma of the pixels in a block fall within a particular distance from the values within a Ri (1≤i≤n) or another R'i (1≤j≤m), respectively. Equivalently, v or v' is detected if the aggregated luma values in a watermark block falls between n*Li and n*Hi or between n*L j and n*Hi, respectively, where $R_i=(L_i, M_i, H_i)$ and $R_j'=(L'j, M'j, H'i)$ are two value ranges for the value v and v', respectively, n is the number of value ranges for the value v, and m is the number of value ranges for the value v'.

For a watermark that is embedded with a single value range, as shown in the example diagram of FIG. 3, if the average luma value of a watermark block of pixels is greater than 128, the symbol value '1' is decoded; otherwise, '0' is decoded. Assume the encoding block size is 8 columns and 2 rows, the average luma value of the block is (l01+ . . . +l07+l10 . . . +l17)/16, where lij is the luma value of the pixel at the row i (0≤i≤1) and the column j (0≤j≤7). Equivalently, the symbol value '1' or '0' is decoded if the accumulated luma value in a block is greater than or less than 16*128, respectively.

In one exemplary embodiment, watermark detection is performed at 1920 horizontal resolution and 1080 vertical resolution of a video frame, and 8-bit luma value. For an input video frame that has different resolutions or different luma bit depths, the input video frame is first converted to 1920 horizontal and 1080 vertical resolutions and at 8-bit luma depth. Then, watermark detection is performed.

Watermarks are weakened after the watermarked video is impaired such as transcoding, frame rate change, resizing, cropping or other lossy processing. In some embodiments, it is desirable to calculate the average luma value of a watermark block by adding a weight to the luma value of each pixel in the watermark block because the impact to the luma value of each pixel in the block may be different due to an impairment. In general, it is likely the impact introduced by impairment on the pixels at the center of the block is less than other pixels in the block. Thus, the luma value of the pixels in the center of a block may deserve a higher weight than other pixels in calculating the average luma value of the block. Table 1 shows an example of weights in an 8×2 block on the top two lines of a video frame. In another example, the bottom row can have weight values (0.25, 0.5, 0.75, 1, 1, 0.75, 0.5, 0.25)

TABLE 1

Exemplary Weight Values for an 8 × 2 block

| 0.25 | 0.5 | 0.75 | 1 | 1 | 0.75 | 0.5 | 0.25 |
| --- | --- | --- | --- | --- | --- | --- | --- |
| 0.25 | 0.5 | 0.5 | 0.5 | 0.5 | 0.5 | 0.5 | 0.25 |

Assume that wij is the weight (0≤wij≤1) for lij where lij is the luma value of the pixel at the row i (0≤i≤1) and the column j (0≤j≤7) of a block 8×2 pixels, the average luma in the block is (l01*w01+ . . . +l07*w07+l10*w10+ . . . +l17*w17)/(w01+ . . . +w087+w10+ . . . +w17).

Different impairments may result in different impacts on the luma value of each pixel in a block. Thus, it is desirable for a detector to make multiple attempts for the best decoding by applying different weight tables. For example, when the neighboring pixels of the watermark block have very bright or dark luminance values, some impairments such as transcoding can cause significant increase or decrease in the luma value of watermarked pixels of the block, leading to decoding of wrong symbol value. One approach for compensating such impact is to scale the luma values in the watermark block in a uniform way before calculating the average luma value in the block for symbol decoding. For example, assume that s is the scaling factor with the value from 0 to 5 and lij is the luma value of the pixel at the row i (0≤i≤1) and the column j (0≤j≤7) of an 8×2 block. The average luma in the block can be determined as (min(l01*s, 255)+ . . . +min(l07*s, 255)+min(l10*s, 255)+ . . . +min (l17*s, 255))/16.

In some embodiments, a watermark detector makes multiple attempts to obtain the best decoding by applying different scaling factors ranging from 0 to 5. For example, the best decoding can be identified as the decoding result that produces the least number of decoding errors.

Weighting and scaling luma values are two techniques that can be applied orthogonally during watermark detection. For example, if 8 weighting tables and 8 scaling factors are defined, there may be a total of 64 attempts of watermark detection. To reduce false positive detections introduced by such multiple attempts, additional error detection and/or error correction codes may be generated.

Quantization-Based Video Watermarking in DCT Domain: In this watermarking technique watermark symbol values are embedded and detected from DCT coefficients of a video frame.

Figure 4:
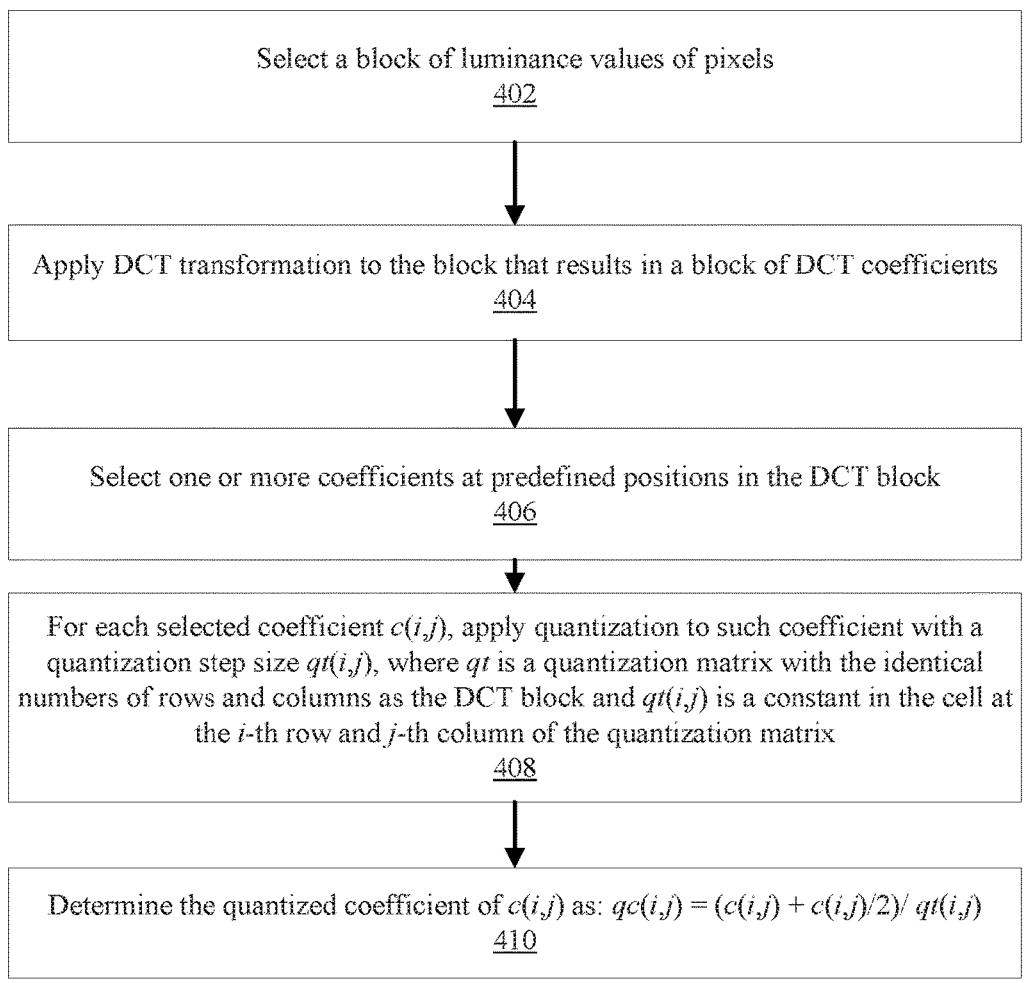
FIG. 4 illustrates a set of operations for determining quantized DCT coefficients as part of the embedding operations in accordance with an exemplary embodiment.

Watermark embedding procedure: FIG. 4 shows a set of exemplary operations for determining quantized DCT coefficients as part of the embedding operations. Select a block of luminance values of pixels (402). Apply DCT transformation to the block that results in a block of DCT coefficients (404); each coefficient is represented by c(i,j) where i and j are the indices to the i-th row and the j-th column of the DCT block. Select one or more coefficients at predefined positions in the DCT block (406). For each selected coefficient c(i,j), quantization is applied to such coefficient with a quantization step size qt(i,j), where qt is a quantization matrix with the identical numbers of rows and columns as the DCT block and qt(i,j) is a constant in the cell at the i-th row and j-th column of the quantization matrix (408). Based on these conventions, qc(i,j), which is the quantized coefficient of c(i,j) can be determined as follows: qc(i,j)=(c(i,j)+c(i,j)/2)/qt(i,j) (see operation 410).

A sample 8×8 quantization table is provided in Table 2, which is the default table adopted in H.264.

TABLE 2

Example 8 × 8 Quantization Table

| 6 | 7 | 8 | 10 | 12 | 14 | 16 | 18 |
| 7 | 9 | 11 | 13 | 15 | 16 | 18 | 20 |
| 8 | 11 | 14 | 16 | 17 | 19 | 21 | 22 |
| 10 | 13 | 16 | 18 | 20 | 22 | 24 | 26 |
| 12 | 15 | 17 | 20 | 23 | 25 | 28 | 30 |
| 14 | 16 | 19 | 22 | 25 | 29 | 34 | 38 |
| 16 | 18 | 21 | 24 | 28 | 34 | 46 | 52 |
| 18 | 20 | 22 | 26 | 30 | 38 | 52 | 72 | qt(i,j) can be scaled using a scaling factor s to increase or decrease the watermark robustness:

$$qt(i,j)=s*qt(i,j).$$

Figure 5:
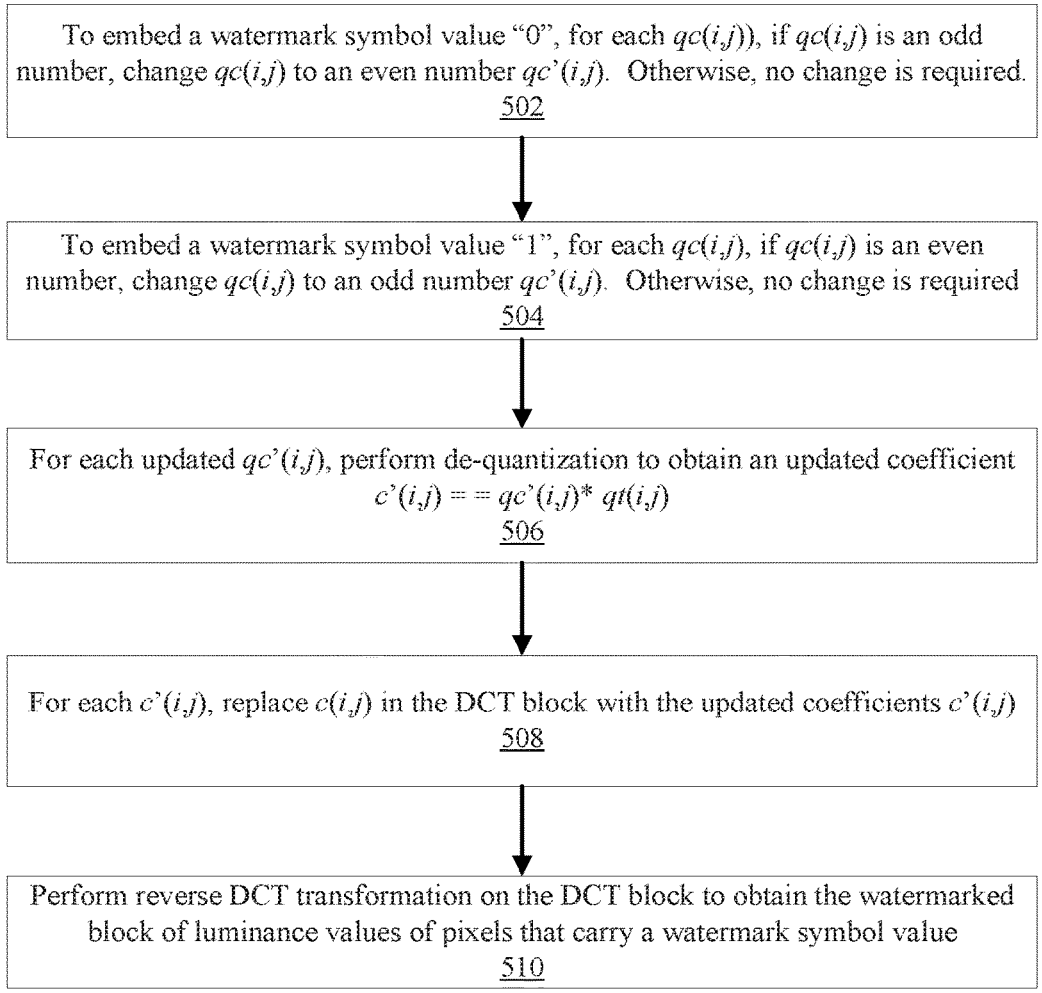
FIG. 5 illustrates a set of operations for embedding a particular watermark value in the DCT domain in accordance with an exemplary embodiment.

FIG. 5 shows a set of exemplary operations for embedding a particular watermark value in the DCT domain. To embed a watermark symbol value "0", for each qc(i,j)), if qc(i,j) is an odd number, qc(i,j) is changed to an even number qc'(i,j); otherwise, no change is required (502). To embed a watermark symbol value "1", for each qc(i,j), if qc(i,j) is an even number, qc(i,j) is changed to an odd number qc'(i,j); otherwise, no change is required (504).

For each updated qc'(i,j), de-quantization is performed to obtain an updated coefficient c'(i,j)=qc'(i,j)*qt(i,j) (see operation 506). For each c'(i,j), c(i,j) is replaced in the DCT block with the updated coefficients c'(i,j) (see operation 508). Next, reverse DCT transformation is performed on the DCT block to obtain the watermarked block of luminance values of pixels that carry a watermark symbol value (510).

An additional step can be added to ensure that the watermarks introduced by quantization are detectable after video processing such as compression at a certain bitrate. This step emulates a compression process by performing compression on the watermarked block followed by a watermark detection procedure. If the watermark symbol value is not detectable after such emulation, the quantization scale factor s is increased and above described embedding operations are repeated.

Figure 6:
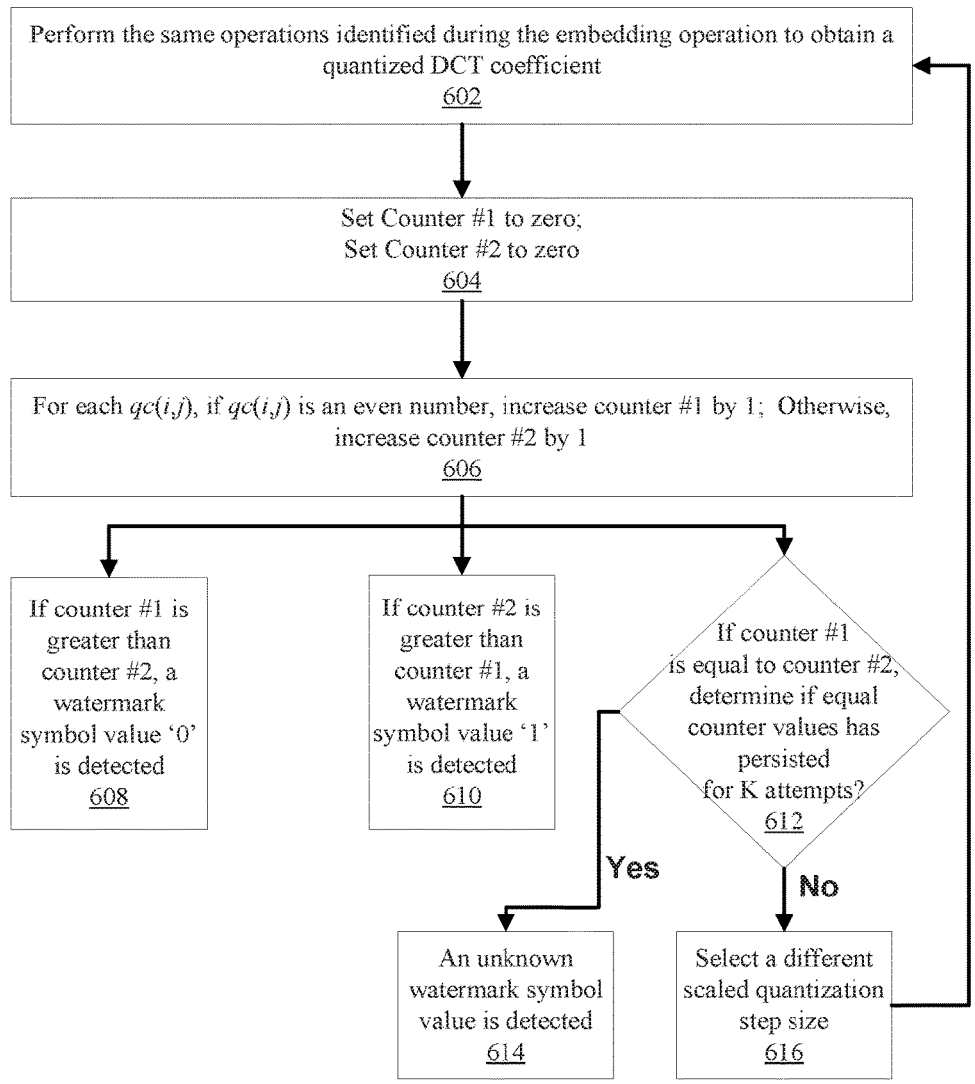
FIG. 6 illustrates a set of operations for extracting watermark symbols from DCT confidents in accordance with an exemplary embodiment.

Watermark Detection Procedure: Watermark symbols can be extracted from the DCT coefficients according the procedure that is described in FIG. 6. The operations start by performing the same operations identified during the embedding operation to obtain the quantized coefficient qc(i,j) (as described in operations 404 to 410 in FIG. 4—these operations may need to be appropriately modified if the content is in compressed format to obtain the DCT coefficients) (602). Next, a first counter and a second counter are set to 0 (604). For each qc(i,j), if qc(i,j) is an even number, the first counter is increased by 1. Otherwise, the second counter by is increased by 1 (606). If the first counter is greater than the second counter, a watermark symbol value '0' is detected (608); if the second counter is greater than the first counter, a watermark symbol value '1' is detected (610). If the first counter is equal to the second counter, a different scaled quantization step size is selected (612 to 616), and operations 602 to 612 are repeated. If the first counter is equal to the second counter, and they have remained equal after serval attempts (e.g., K=5), an unknown watermark symbol value is detected (612 to 614).

In one embodiment, 240 8×8 blocks in the top 8 lines of a high-definition video frame at resolution 1080×1920 are selected to embed 240 watermark bits. The watermark bits are encoded with a payload and error correction bits. A payload structure that contains 50 bits can be encoded to 240 watermark bits with error correction in this case. In one example, such a 50-bit watermark payload conforms to the watermark payload for ATSC 3.0 that was submitted by Verance Corporation (i.e., VP1 payload structure). In particular, such a payload includes a server identification portion, and an interval code portion to enable acquisition of metadata and/or additional features through a metadata server.

When the same payload is embedded into multiple video frames, aggregation of watermark bits from multiple frames containing the same payload can be applied to improve detection reliability.

In some scenarios (e.g., where the watermark detector is not able to access the decoded (e.g., decompressed) video frames or the decoded video is not available to watermark detector), it is desirable to perform watermark detection directly from encoded (e.g., compressed) video, or partially decoded video frames. In most video codecs such as MPEG-2, H.264 and H.265, the quantized DCT coefficients can be accessed from the encoded video without a full scale decoding or decompression. In particular, the quantized DCT coefficients are typically encoded using entropy coding algorithms such as VLC Variable Length Code, Context-adaptive variable-length coding (CAVLC), and Context-based Adaptive Binary Arithmetic Coding (CABAC) in modern video codecs. The entropy decoding operation is required in order to access the quantized coefficients from encoded video. CABAC is a popular and efficient entropy encoding algorithm and widely used in high-quality video encoding. A minimal CABAC encoding or decoding unit is typically a video slice. Thus, when an area of the video frame (e.g., the top 8 lines) is watermarked, it is desirable to encode such area as a separate slice or into a slice with a minimal size so that CABAC decoding is only applied to such slice for watermark detection. As such, during the encoding of the video watermark, particular locations within the video frame can be selected for embedding of watermarks so as to facilitate detection of watermarks from partially decoded or decompressed video content.

Payload Structure and Improvements on Payload Recovery: The series of watermark symbol values embedded in a video frame usually includes a header, a payload, and one or more error correction and/or error detection code symbols. According to an exemplary embodiment, the first section of the watermark is a 24-bit header that can include both a predetermined (e.g., fixed) and a variable set of values. The second section is a 160-bit payload as defined in VP1 payload structure that includes a predetermined header and a (127,50,13) BCH code (having 50 bits of VP1 payload) and a patch (or dummy) bit. In one exemplary embodiments, the third section is 40 bits that includes one or more error correction and/or detection code symbols (e.g., CRC code symbols) and/or one or more a patch (or dummy) bits. In some embodiments, the third section can additionally, or alternatively, include a cryptographic digest or a hash. The error correction and/or detection code symbols and/or the cryptographic digest/hash are, for example, generated based on the entire watermark packet including that payload and the header sections.

According to an exemplary embodiment, the 50-bit payload is divided into two regions: a 1-bit payload type and a 49-bit payload field. The payload type field describes the format of the payload field. The payload fields includes a server code identifying the metadata server, an interval code identifying the content and media time, and a query bit indicating the client to query the metadata for metadata.

According to an exemplary embodiment, the total of 240 bits is embedded in every frame in 1.5-second segments of the content. That is, for a frame rate of 24 frames per second, a constant 240-bit value is embedded in each frame of a sequence of 24 frames.

The detection of the header section can be used to ascertain whether or not watermarks are present in a video frame without attempting to recover the payload. The header section can also be used to identify the start of watermarks when video frames are geometrically distorted, such as when the content is resized or cropped. The header section can also be used to calibrate the characteristics of an impaired video that contains watermarks. For example, in a watermarking technique that uses a single luminance value range, the detected header section can be used to determine an appropriate (e.g., an optimal) scaling factor.

Figure 7:
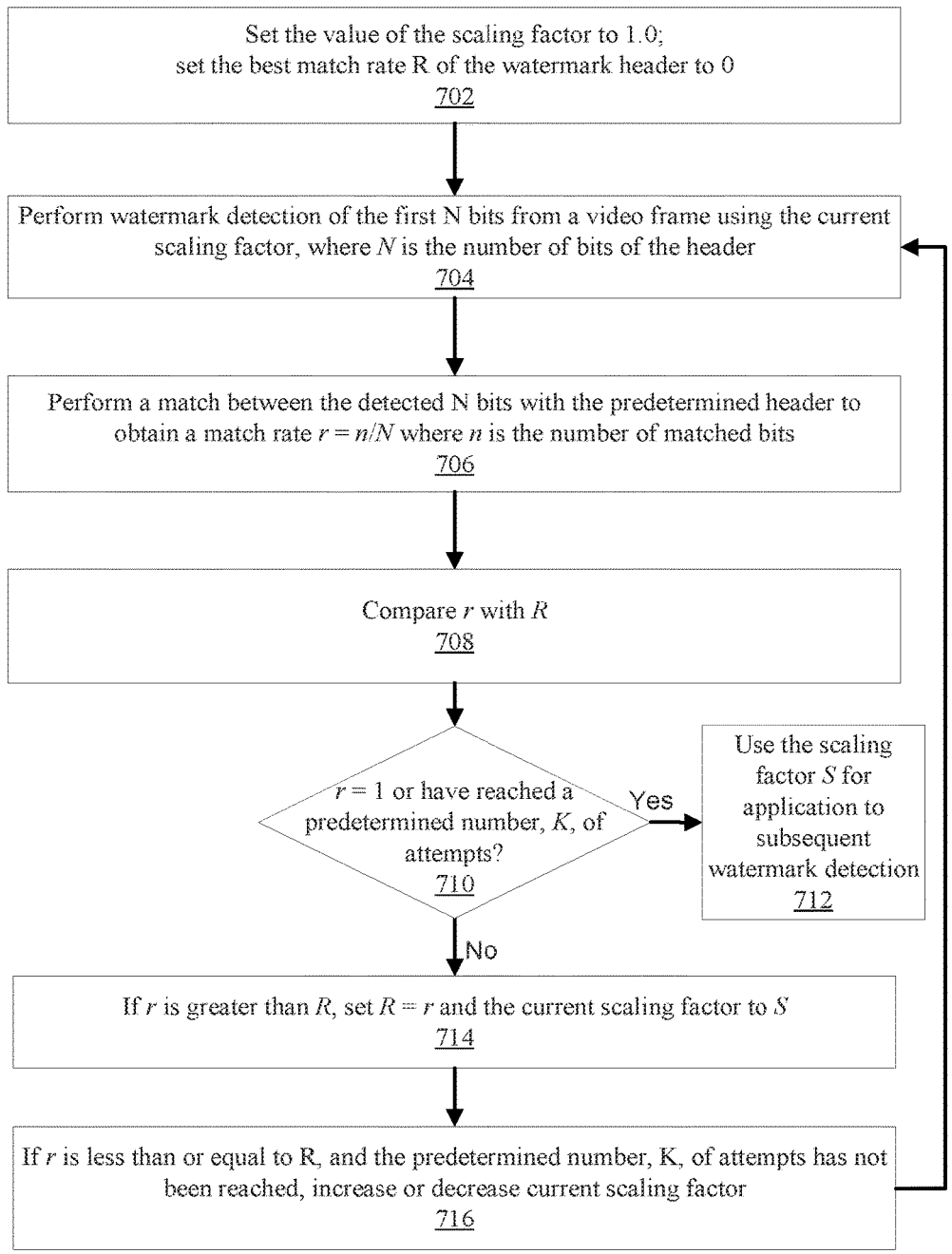
FIG. 7 illustrates a set of operations that can be carried out for determining a suitable scaling factor in accordance with an exemplary embodiment.

FIG. 7 illustrates a set of exemplary operations that can be carried out for determining a suitable scaling factor. Set the value of the scaling factor to 1.0 and set the best match rate R of the watermark header to 0 (702). Perform watermark detection of the first N bits from a video frame using the current scaling factor, where N is the number of bits of the header (704). Perform a match between the detected N bits with the predetermined header to obtain a match rate r=n/N where n is the number of matched bits (706). Make a comparison between r and R (708). If r is equal to 1 or a predetermined number, K, of attempts (e.g., K=5) has reached (Yes at 710), use the scaling factor S for application to subsequent watermark detection (712). If r is greater than R, set R to r and the current scaling factor to S (714) and then go to operation 716. If the predetermined number of attempts has not been reached, increase or decrease the current scaling factor (at 716) and go back to operation 704. The increase or decrease of the current scaling factor at 716 can be done iteratively to obtain the proper scaling factor S.

Embedding of constant payloads over a period of time, such as 1.5 seconds, not only avoids possible artifacts such as flickering introduced by watermarks, it also helps payload recovery by enabling detection techniques that rely on accumulating watermarks over multiple frames. Accumulation may be performed at different layers. At the first layer, the luma values for a watermark symbol over multiple frames can be added together before performing watermark detection. Using this techniques, for example, the symbol value '1' or '0' is decoded upon a determination that the accumulated luma value in a block with n pixels over m frames is greater or less than m*n*128, respectively.

At the next layer, the decoded bits can be accumulated prior to performing error correction and/or detection decoding. For example, if a watermark symbol value '1' is detected m times and '0' is decoded n times over m+n frames, the symbol value is voted as '1' if m is greater than n, or '0' otherwise.

Moreover, when a symbol value is detected, it may be associated with a confidence value which is measured based on the distance between the average luma of a block and the midrange value in a value single range. To further illustrate this embodiment, let's assume M is the midrange in a single range approach, the confidence level, c, associated with a watermark symbol is measured as the absolute value of $(l_{AVG}-M)/M$ where $l_{AVG}$ is the average luma of a watermark block. Let's further assume that v is 1 if a symbol value '1' is detected from a frame i and ci is the associated confidence ($1 \le i < m$), and that v' is −1 if a symbol value "0" is detected from detected from a frame j and cj' is the associated confidence ($1 \le j < n$). The final symbol value is voted as '1' if $c1*v+c2*v+ \ldots cm*v+c1'*v'+c2'*v'+ \ldots +cn'*v'$ is greater than 0; otherwise the symbol value is '0'.

One or more additional message types can be defined for the video watermark described above. For example, one additional message type can include a 159-bit or 160-bit if including a patch (dummy) bit watermark frame that is a VP1 payload structure. When this message type is employed, it should be repeated without change in all video frames over a 1.5-second interval. When the message type is employed in video content for which accompanying audio content carries a particular audio watermark (e.g., VP1 watermark), it should carry the same frame data with time-synchronized frame boundaries.

This arrangement will provide broadcasters with the option of employing a payload format and broadband protocol as a single protocol for delivering service signaling recovery through both the audio and video watermark. In addition to allowing broadcasters to avoid the need to support separate protocols for the audio and video watermarks, it also improves the performance of the video watermark via the synchronization and error correction capabilities of the VP1 frame structure and message repetition, allowing the video watermark to be embedded with better video quality (lower luminance, less flicker) and survive redistribution channels with greater impairments than would otherwise be possible. Because the VP1 payload structure contains header and parity bits in addition to payload bits and because it is always repeated in multiple video frames, it may be recoverable from content for which the other message is not recoverable.

One aspect of the disclosed technology relates to a method for detection of a video watermark from a multimedia content that includes obtaining, at a watermark extractor that is implemented at least partially in hardware, one or more blocks of sample values representing image pixels in a video frame, where each block includes one or more rows of pixel values and one or more columns of pixel values. This method further includes using the watermark extractor to extract one or more video watermarks from the one or more blocks. Watermark extraction for each block includes (a) determining a weighted sum of the pixel values in the block produced by multiplying each pixel value with a particular weight coefficient and summing the result together, where the particular weight coefficients for each block are selected to at least partially compensate for degradation of video watermark or watermarks in each block due to impairments caused by transmission or processing of the multimedia content. Watermark extraction for each block also includes (b) comparing the weighted sum of the pixel values to one or more predetermined threshold values, (c) upon a determination that the weighted sum falls within a first range of the one or more predetermined threshold values, identifying a detected watermark symbol having a first value, and (d) upon a determination that the weighted sum falls within a second range of the one or more predetermined threshold values, identifying a detected watermark symbol having a second value. The above noted method additionally includes repeating operations (a) through (d) for a plurality of the one or more blocks to obtain a plurality of the detected watermark symbol values, and determining whether or not the plurality of the detected watermark symbols values form a valid watermark payload.

In one exemplary embodiment, for each block, the particular coefficients that are positioned closer to the center of the block are assigned a higher weight value than the particular coefficients that are positioned closer to the edge of the block. In another exemplary embodiment, the one or more predetermined threshold values include a low range, a high range and a mid range value, the detected watermark symbol is identified as having the first value upon a determination that the weighted sum has a value between the mid range and low range of values, and the detected watermark symbol is identified as having the second value upon a determination that the weighted sum has a value between the mid range and high range of values. In yet another exemplary embodiment, the one or more predetermined threshold values include a mid range value, the detected watermark symbol is identified as having the first value upon a determination that the weighted sum has a value lower than the mid range value, and the detected watermark symbol is identified as having the second value upon a determination that the weighted sum has a value larger than the mid range value.

In one embodiment, the weighted sum includes a weighted sum of luma values. In another exemplary embodiment, the weighted sum includes a normalized sum obtained by dividing the weighted sum by the sum of pixel values in the block. In yet another exemplary embodiment, determining whether or not the plurality of the detected watermark symbols values form a valid watermark payload includes performing an error correction code decoding to determine whether or not the plurality of detected watermark symbols form a valid codeword of the error correction code. In still another exemplary embodiment, determining whether or not the plurality of the detected watermark symbols values form a valid watermark payload includes comparing the plurality of the detected watermark symbols to a predefined pattern of symbols, and identifying that the plurality of detected watermark symbols form a valid watermark payload upon a determination that a number of mismatches between the predefined pattern and the detected plurality of watermark symbols is below a particular threshold.

According to one exemplary embodiment, upon a failure to detect a valid watermark payload, the above noted method includes determining a new weighted sum of the pixel values in the block by multiplying each pixel value with a new weight coefficient, repeating the above noted operations (b) through (c) using the new weighted sum for each of the one or more blocks to obtain the plurality of the detected watermark symbols values, and repeating the determination as to whether or not the plurality of the detected watermark symbols values form a valid watermark payload. In another exemplary embodiment, the above noted method for detection of a video watermark from a multimedia content includes prior to operation (a), scaling luma values of the pixel values in the block by multiplying each pixel value in the block with a corresponding scaling factor to provide scaled luma values within the block that are substantially uniform. In one exemplary embodiment, determining the weighted sum includes determining an average luma value according to $$\text{Average Luma} = \sum \frac{\min(lij * s, M)}{\text{Max\_i} * \text{Max\_j}},$$

where the summation is conducted for $1 \leq i \leq \text{Max\_i}$ and $1 \leq j \leq \text{Max\_j}$, and where i and j denote a row and column, respectively, in each block having Max_i rows and Max_j columns, lij is the luma value for the pixel in i-th row and j-th column, M is the maximum luma range of each pixel, and S is a scaling factor.

In another example embodiment, the above noted method for detection of a video watermark from a multimedia content further includes obtaining one or more additional blocks of sample values, where each of the one or more additional blocks represents image pixels in one or more additional video frames, respectively, and the method further includes producing a new sum based on cumulative pixel values of the one or more blocks. In still another exemplary embodiment, the new sum is produced by combining luma values of pixels corresponding to each of the one or more additional blocks with the weighted sum that is produced in the above noted operation (a), and performing the remaining operations for determining whether or not the plurality of the detected watermark symbols values form a valid watermark payload using the new sum.

Another aspect of the disclosed embodiments relates to a device that includes a processor, and a memory including processor executable code. The processor executable code, when executed by the processor, causes the device to obtain, at a watermark extractor, one or more blocks of sample values representing image pixels in a video frame, where each block including one or more rows of pixel values and one or more columns of pixel values. The processor executable code, when executed by the processor, further causes the device to use the watermark extractor to extract one or more video watermarks from the one or more blocks, including for each block (a) determine a weighted sum of the pixel values in the block produced by multiplying each pixel value with a particular weight coefficient and summing the result together, where the particular weight coefficients for each block are selected to at least partially compensate for degradation of video watermark or watermarks in each block due to impairments caused by transmission or processing of the multimedia content. The processor executable code, when executed by the processor, further causes the device to (b) compare the weighted sum of the pixel values to one or more predetermined threshold values, (c) upon a determination that the weighted sum falls within a first range of the one or more predetermined threshold values, identify a detected watermark symbol having a first value; and (d) upon a determination that the weighted sum falls within a second range of the one or more predetermined threshold values, identify a detected watermark symbol having a second value. The processor executable code, when executed by the processor, additionally causes the device to repeat items (a) through (d) for a plurality of the one or more blocks to obtain a plurality of the detected watermark symbol values, and determine whether or not the plurality of the detected watermark symbols values form a valid watermark payload.

The above noted device that includes the processor, and the memory with processor executable code can further be configured, upon execution of the processor executed code by the processor, to implement additional watermark embedding or detection operations that are discussed in this document.

Another aspect of the disclosed technology relates to a computer program product, embodied on one or more non-transitory computer readable media, that includes program code for obtaining one or more blocks of sample values representing image pixels in a video frame, where each block includes one or more rows of pixel values and one or more columns of pixel values. The program product also includes program code for extracting one or more video watermarks from the one or more blocks, including, for each block: (a) determining a weighted sum of the pixel values in the block produced by multiplying each pixel value with a particular weight coefficient and summing the result together, where the particular weight coefficients for each block are selected to at least partially compensate for degradation of video watermark or watermarks in each block due to impairments caused by transmission or processing of the multimedia content. The program product also includes program code for, for each block (b) comparing the weighted sum of the pixel values to one or more predetermined threshold values, (c) upon a determination that the weighted sum falls within a first range of the one or more predetermined threshold values, identifying a detected watermark symbol having a first value, (d) upon a determination that the weighted sum falls within a second range of the one or more predetermined threshold values, identifying a detected watermark symbol having a second value. The above noted program product also includes program code for repeating operations (a) through (d) for a plurality of the one or more blocks to obtain a plurality of the detected watermark symbol values, and program code for determining whether or not the plurality of the detected watermark symbols values form a valid watermark payload. The above noted program produce can also include additional program code for implementing additional watermark embedding or detection operations that are discussed in this document.

ATSC Video Mark Detector Upgrades: In the sections that follows, it is assumed that ATSC video mark is based on video watermarking specified by ATSC (see http://atsc.org/wp-content/uploads/2015/12/A335S33-156r3-Video-Watermark-Emission.pdf and http://atsc.org/wp-content/uploads/2016/03/S33-178r2-Content-Recovery-in-Redistribution-Scenarios.pdf). In this proposal, the luma of top two lines of a frame are modified to represent binary symbols, which is described in Section 4 of the above noted Video Watermark Emission ATSC Candidate Standard, as "[t]he video watermarking technology specified herein involves modulation of the luma component of video within the top two lines of active video in each video frame." For the purposes of illustration and not by limitation, let's further assume that black pixels (e.g. luma value 4) represent zero, and near black pixels (e.g. luma value 40) represent bit one. Using this singling schemer, only small modifications are needed to enable watermark embedding and detection in and from a different physical layer, such as a layer that uses luma values [112, 143] for zero and one, respectively.

Further, let's assume that in some implementations, certain types of watermarks are embedded with a 50-bit payload that changes on 1.5 second boundaries (e.g., a particular field within the watermark payload (the Interval Code) is incremented every 1.5 seconds), and uses a forward error correction (FEC). In other implementations, however, those watermarks are placed only in a subset of frames, say J consecutive frames in every 1.5 second of content, e.g. J=5. For the sake of illustration, and not by limitation, in the examples that are provided below, it is assumed that the watermark rate is 240 bits per frame, and each watermark includes a 22 bits for watermark header, 50 bits for watermark payload, and 168 parity bits. It should be noted that modifications to these values can be readily implemented to allow operation in data link layers with different parameters, e.g., with 160 or 120 bits per frame.

Detector States: In some implementations, a video mark detector can operate in two states: extraction state or confirmation state. In extraction state, the detector is attempting to acquire an unknown payload. In confirmation state, there is a set of multiple (e.g., two) expected payloads in each frame and the detector is deciding whether one of the expected payloads is present, an unexpected payload is present, or no payload is present. In one exemplary implementation, when initialized, the detector is in the extraction state.

Figure 8:
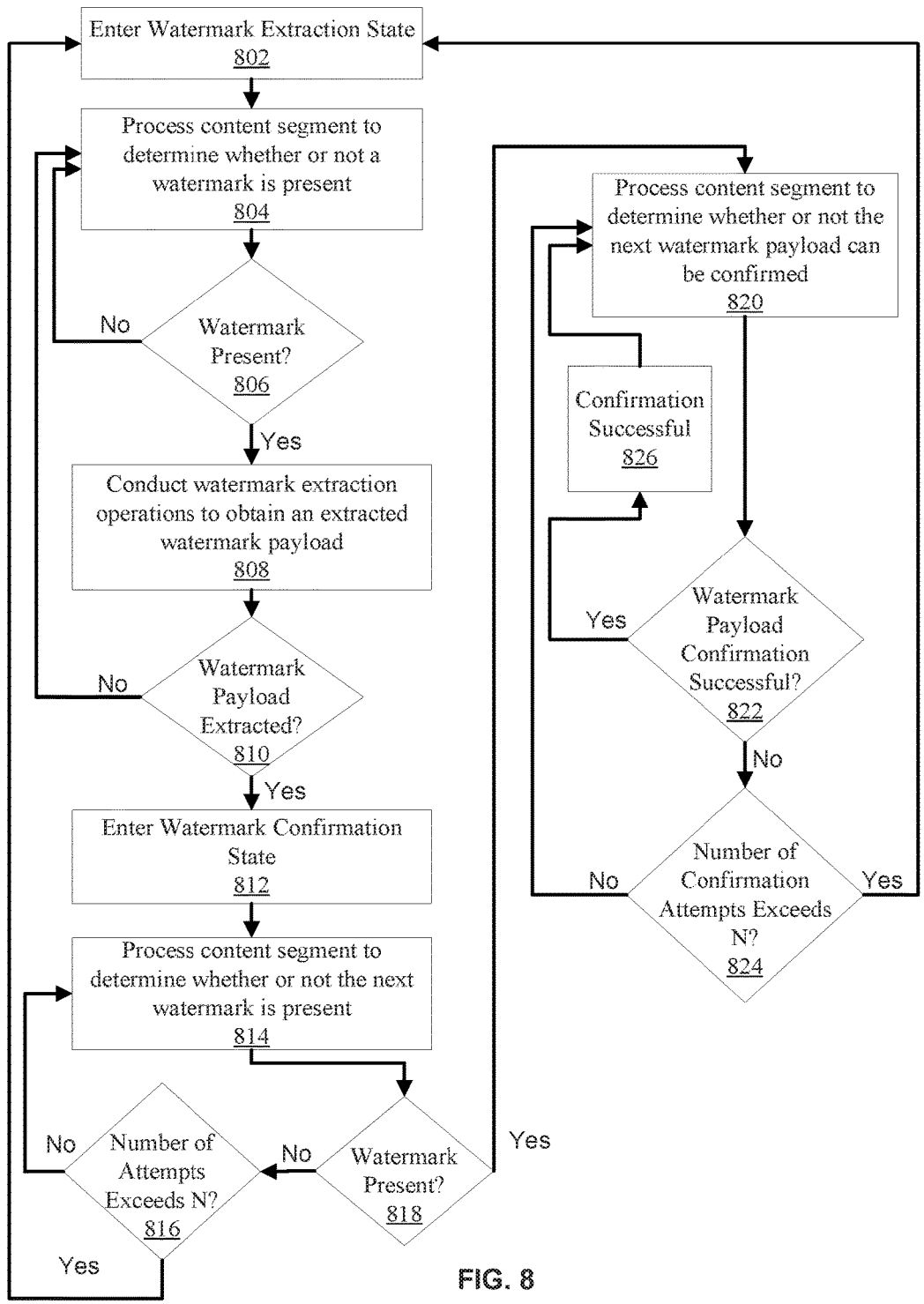
FIG. 8 illustrates a set of operations for detecting a watermark from a video content in accordance with an exemplary embodiment.

Mark Presence: Before any attempt to extract a payload or to confirm the presence of payload, the detector decides whether a mark is present or not. If the detector finds that the mark is not present, no attempt to find the payload is made. If detector finds a mark absent in N consecutive frames, and if the detector is in the confirmation state, the detector moves to the extraction state. The number, N, depends on the frame rate. For example, N can correspond to the number of frames displayed in 1.5 seconds. These operations are illustrated in the exemplary flow chart of FIG. 8. In particular, at 802, the watermark detector enters watermark extraction state. At 804, it the content segment is analyze to determine whether or not a watermark is present. If a watermark presence is not detected (No at 806), the operations return to 802. Upon a determination that a watermark is present (Yes at 806), watermark extraction operations are conducted at 808 to determine whether or not a particular payload value can be detected. If no watermark payload is detected (No at 810), the operations return to 802, otherwise (Yes at 810), the watermark detector enters the confirmation state at 812.

At 814, the content is analyzed to determine whether or not the next watermark is present. If watermark presence is not detected (No at 818), it is determine whether or not the number of attempts to detect the presence of watermark has exceeded a particular threshold, and if so (Yes at 816), the detector returns to watermark extraction state. If the number of attempts has not exceeded the threshold number of attempts (no at 816), the operations return to 814 so that the presence of the next watermark can be detected. If, at 818, it is determined that a watermark is present, the content is analyzed, at 820, to determine whether or not the next watermark payload can be confirmed. Upon confirmation of the next watermark (Yes at 822), the detector, at 826, indicates that confirmation of the watermark payload has been successful, and the operations return to 820 to confirm the presence of the next watermark payload. If, on the other hand, the watermark payload cannot be confirmed (No at 822), it is determined if the number of confirmation attempts has exceeded a predetermine threshold, and if so (Yes at 824), the detector returns to the extraction state. If the number of attempts to confirm the next watermark payload has not exceeded the predetermined threshold (No at 824), then the operations return to 820 to confirm the presence of the next watermark payload. It should be noted that in some embodiments, the predetermined threshold values in operations 816 and 824 are different, while in other embodiments, the same predetermined threshold value can be used.

In some embodiments, the mark presence can be decided by counting the number of symbols having a luma value outside of a predefined range. The predefined range can be determined based on the luma range that is used for embedding watermark symbols. For example, if a watermark embedding techniques embeds 240 watermark symbols per frame, and uses luma values of 4 and 40 to embed a zero and a one, respectively, the detector can count how many symbols have an average luma value above 60, and if the number of such symbols is above 120, the detector decides that the mark is absent. In one example, symbol boundaries are determined by dividing the first two lines a video frame it into 240 identical rectangles, where each rectangle representing one symbol. Similarly, the detector can count the number of symbols having a luma value below a threshold, e.g., below a luma value of 18. If the number of such symbols is too high, say above 220 in the case of 240 symbols per frame, the detector may identify the frame as an unmarked frame. Otherwise, it is assumed that the mark present. In the above watermarking scheme, the value of the threshold (e.g., 18) is sufficiently below the expected or average value of (40+4)/2=22. Thus the detection of such a large number of low-valued bits would be inconsistent with embedding of a watermark which typically includes many one and zeroes.

Similarly, in the case where luma values of 112 and 143 are used for embedding a zero and a one, respectively, the symbols with an average luma below 100 or above 155 are counted, and if this count is above 120, the absence of the mark absence is declared.

Payload Extraction: When a mark is present in a video frame, the detector forms a candidate bit pattern typically by comparing the average luma value per symbol with a predefined threshold T. Alternate methods of forming a candidate bit pattern are described above, all of them involving a comparison with a threshold. After confirming the presence of a header, if any, the detector then attempts to extract the watermark payload using a forward error correction (FEC) decoder. The FEC decoder utilizes a particular error correction code decoding technique to determine whether or not the extracted payload forms a valid codeword of the error correction code. If the extraction is successful, and if the number of bits in error is below a threshold, the payload is reported, and the detector moves to the confirmation state.

If watermark extraction from a single frame (i.e., single-frame detection) is not successful, the detector proceeds with multi-frame extraction techniques, as described earlier in this document. In the sections that follow, two exemplary multi-frame detection techniques, referred to as the luma-sum and the bit-sum techniques, are described. In some embodiments, both techniques are implemented in the detector, while in other embodiments, only one technique is implemented. In some scenarios, the luma-sum technique can provide better detection results such as when distortion to the content causes a luma variation distribution that is concentrated (e.g., has a Gaussian distribution), while in other scenarios the bit-sum technique can produce better detection results such as when luma errors are scattered (e.g., are uniformly distributed).

Luma-Sum Technique: In the luma-sum technique, a luma-sum vector that includes a list of integers is initialized (e.g., to zero), and a frame counter (Fc) is also initialized (e.g., to zero). The initialization is repeated whenever the detector transitions from the confirmation state to the extraction state.

The luma-sum vector may have as many elements as there are symbols per frame, e.g., 240 elements. Alternatively, the number of elements in the luma-sum vector may skip the header bits and only account for the payload and parity bits. When the single-frame detection fails, the average luma per symbol is added to the corresponding element in the luma-sum vector, and the frame counter is incremented.

In some embodiments, if the frame counter is larger than one, a new candidate bit stream is formed by comparing the elements of the luma-sum vector with a threshold, Fc*T. Alternatively, the luma-sum vector can be divided by Fc and the elements of the luma-sum vector can be compared to threshold T to form the candidate bit pattern. The candidate bit pattern is then submitted to the FEC decoder. If the extraction is successful, the payload is reported, and the detector moves to the confirmation state. In some embodiments, in order to further improve the reliability of watermark extractions, even when the FEC decoding is successful, it is further determined how many errors have been corrected by the FEC decoder, and only if the number of corrected errors are not too high (i.e., corrected errors are below a predetermined threshold), the detector moves to the confirmation state. For example, if the FEC code can correct up to 13 errors, the detector moves to the confirmation state only when fewer than 11 errors have been corrected.

If the extraction attempt is not successful, then the detector compares Fc with another threshold, M. If Fc is above the threshold, M, (which indicates that more than M frames have already been considered) the luma-sum vector and Fc are initialized (e.g., to zero). The threshold, M, depends on the frame rate. In some embodiments, M has value that is equal to the number of frames that are presented in 0.5 seconds of the content.

In an alternative embodiment, the detector maintains a list of luma values associated with symbols in the last L frames, e.g. L=5. Once the list is full, the luma values for each symbol are summed, and the sum is compared with a threshold L*M to form the candidate bit pattern, which is the submitted to FEC decoder. If the extraction is successful, and if number of bits in error is below a threshold, the payload is reported, and the detector moves to the confirmation state.

Figure 9:
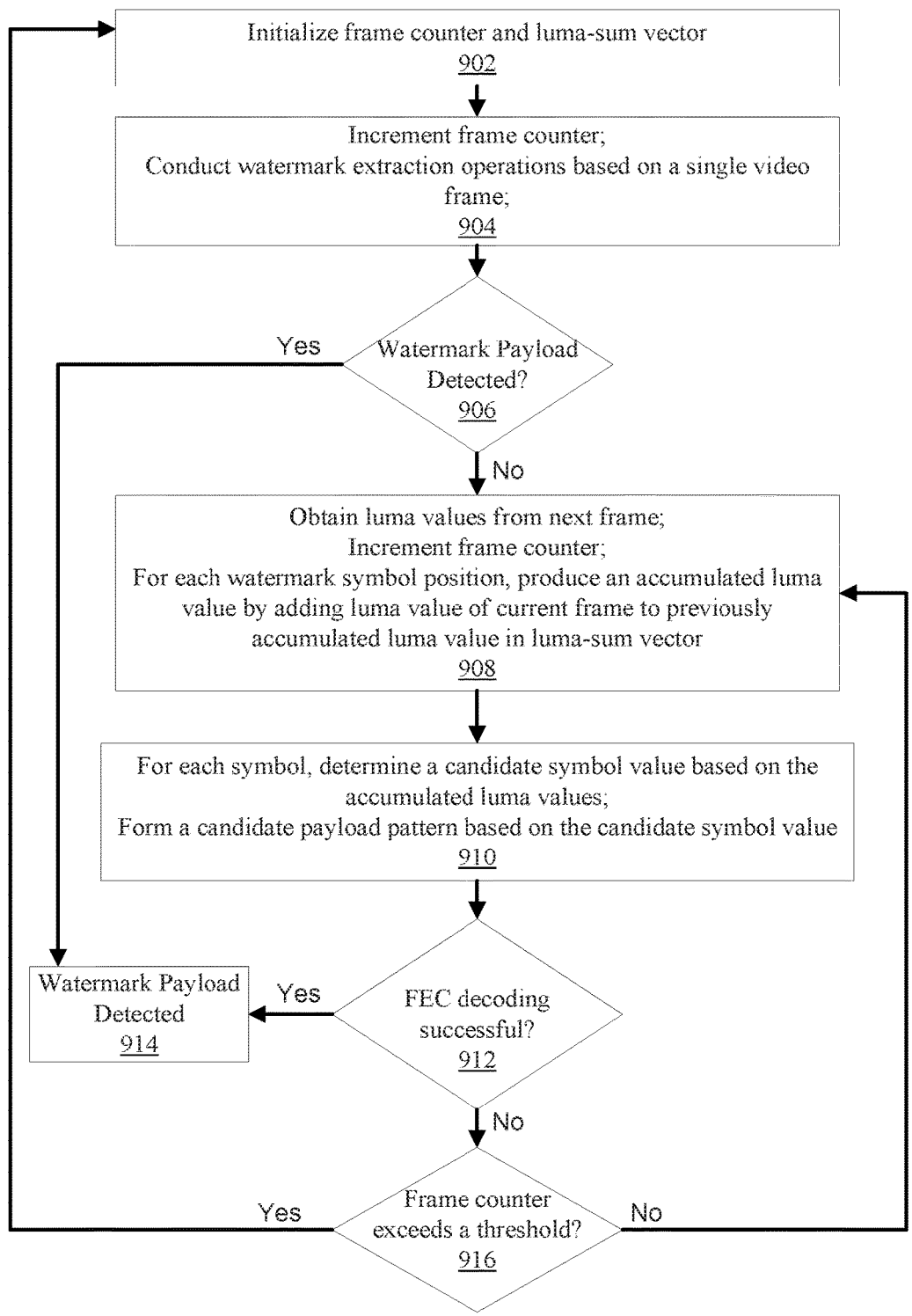
FIG. 9 illustrates a set of operations for detection of watermark payload from a video content using luma-sum technique in accordance with an exemplary embodiment.

FIG. 9 illustrates a flow chart for the above-described operations to detect a payload based on the luma-sum technique. In particular, at 902, the frame counter and the luma-sum vector are initialized. At 904, single frame detection is performed and the frame counter is incremented. The operations at 904 can also include storing the luma values for the current frame in the luma-sum vector. Such a luma-sum vector is needed if the payload is not detected. If a watermark payload is detected (Yes at 906), an indication is provided at 914 that payload detection has been successful, and the detector can move to the confirmation state. Upon a successful detection, the detected payload and its location can also be reported. On the other hand, if a watermark is not detected (No at 906), the operations move to 908, where the luma values from the next frame are obtained, the frame counter is incremented, and, for each watermark symbol position, an accumulated luma value is produced by adding the luma value of the current frame to the previously accumulated luma value in luma-sum vector. At 910, for each symbol, a candidate symbol value is determined based on the accumulated luma values and a predetermined threshold, and a candidate payload pattern is formed using the candidate symbol values. The candidate payload pattern is then submitted to an FEC decoder.

Upon a determination that the FEC decoder successfully detects a watermark payload (Yes at 912), the operations move to 914 to indicate that a payload has been detected. The candidate payload pattern (and the current time of the detection) can, for example, be reported. Upon a determination that the FEC decoder is unsuccessful (No at 912) (e.g., indicating that candidate pattern has too many errors to be considered a reliably-detected watermark), the operations move to 916, where it is determined whether or not the frame counter value has exceeded a predetermined threshold number. Upon a determination that the frame counter exceeds the predetermined threshold (Yes at 916), the detector is reset by returning to 902. If the frame counter has not exceeded the predetermined threshold (No at 916), the operations return to 908 to accumulate the luma values that are obtained from the next video frame.

Bit-Sum Technique: The bit-sum technique uses a similar approach as the luma-sum technique, except that a bit-sum vector is generated that contains the sum of bits detected in the same position (within the watermark payload) from consecutive frames. In particular, element j in the bit-sum vector indicates how many times bit value "one" has been found for symbol j in the last Fc frames. If Fc is larger than 2, then a new candidate bit pattern is formed by setting bit j to value "one" if the count is larger than Fc/2, else the bit value is set to "zero." The above procedure is carried out for all bit positions, and the candidate bit pattern is passed to the FEC decoder. If the extraction is successful (and, in some embodiments, if number of bits in error is below a threshold), the payload is reported, and the detector moves to the confirmation state. Similar to the luma-sum technique, the value of Fc is compared to a threshold, M', and if Fc is above the threshold, M', the bit-sum vector and Fc are initialized (e.g., to zero). It should be noted that while the above description indicates that summing of the bit values are conducted for values of Fc that are larger than 2, in some scenarios these operations can be carried out even when Fc is equal to 2. For instance, when the detected symbols from two frames have the same value (e.g., both are zero or both are one), the bit sum technique can be carried out as described. However, for symbols that are detected as having different values, one or the other symbol value can be assigned. In some embodiments, such an assignment can be a random selection, while in other embodiments, a particular symbol can be selected. In some embodiments, both symbols can be selected in different iterations of a trial-and-error procedure. These selection procedures can also be generalized and implemented when an equal number of ones and zeros (or an equal number of different-valued symbols) are obtained from an even number of video frames.

In an alternative embodiment, the detector maintains a list of bit values associated with symbols in last L frames, e.g. L=5. Once the list is full, the values for each symbol are summed, and the sum is compared to a threshold L/2 to form the candidate bit pattern, which is then submitted to FEC decoder. If the extraction is successful, and if number of bits in error is below a threshold, the payload is reported, and the detector moves to confirmation state.

Figure 10:
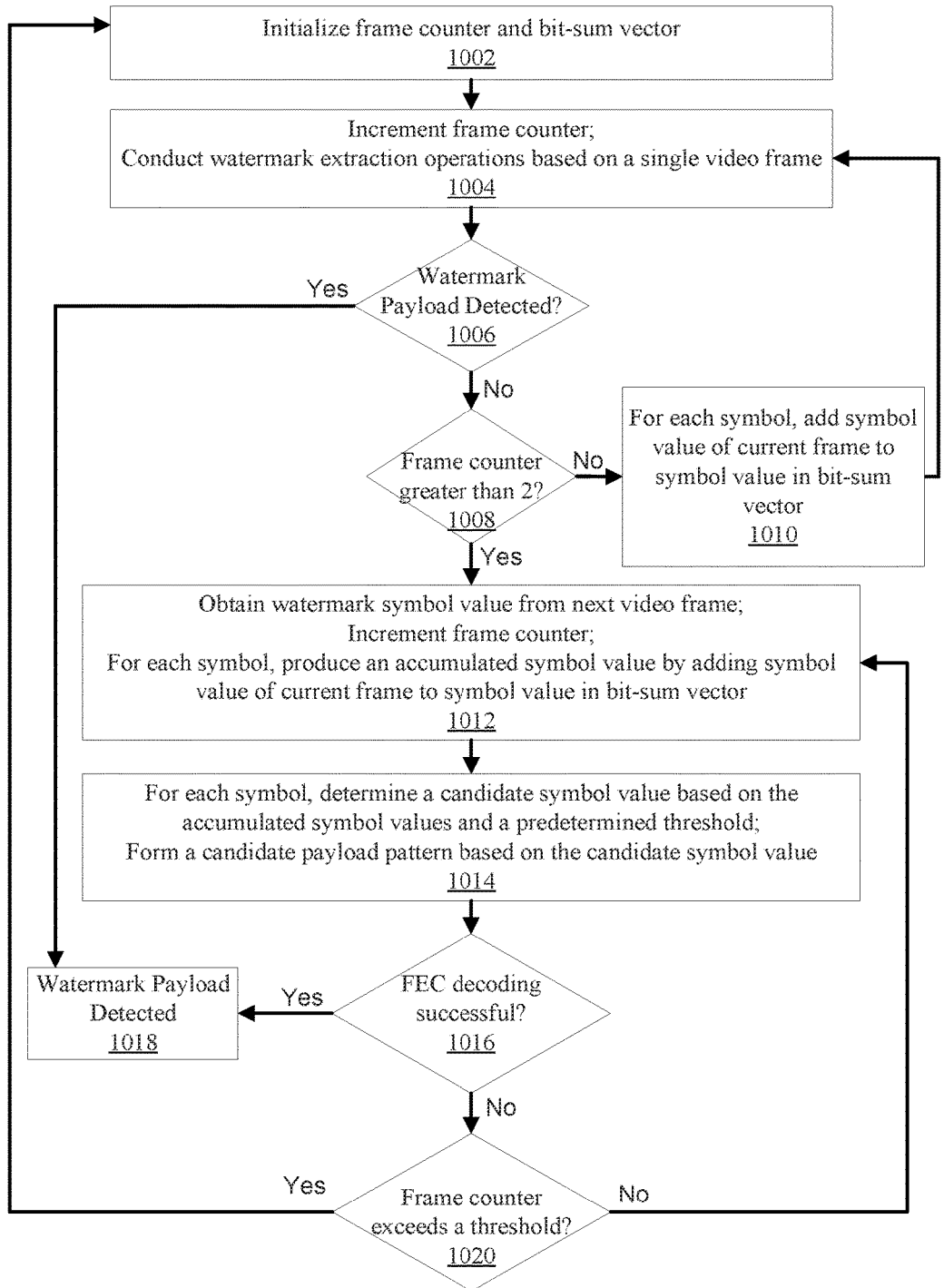
FIG. 10 illustrates a set of operations for detection of watermark payload from a video content using bit-sum technique in accordance with an exemplary embodiment.

FIG. 10 illustrates a flow chart for the above-described operations to detect a watermark payload based on the bit-sum technique. In particular, at 1002, the frame counter and the bit-sum vector are initialized. At 1004, single frame detection is performed and the frame counter is incremented. The operations at 1004 can also include storing the symbol values for the current frame in the bit-sum vector. Such a bit-sum vector is needed if the payload is not detected. If a watermark payload is detected (Yes at 1006), an indication is provided at 1018 that payload detection has been successful, and the detector can move to the confirmation state. Upon a successful payload detection, the detected payload and its location can also be reported. On the other hand, if a watermark is not detected (No at 1006) and less than 3 frames have been examined (NO at 1008), the bit-sum vector is updated, at 1010, by adding the symbol values (e.g., 1 or 0) obtained from the current video frame to the values that are stored in the bit-sum vector. The operations then return to 1004. If a watermark is not detected (No at 1006) and the frame counter exceeds 2 (Yes at 1008), the operations move to 1012, where the symbol values from the next frame are obtained, the frame counter is incremented, and, for each watermark symbol position, an accumulated symbol value is produced by adding the symbol value of the current video frame to the previously accumulated symbol value in bit-sum vector. At 1014, for each symbol, a candidate symbol value is determined based on the accumulated symbol values, and a candidate payload pattern is formed using the candidate symbol values. The candidate payload pattern is then submitted to an FEC decoder.

Upon a determination that the FEC decoder successfully detects a watermark payload (Yes at 1016), the operations move to 1018 to indicate that a payload has been detected. The candidate payload pattern (and the current time of the detection) can, for example, be reported. Upon a determination that the FEC decoder is unsuccessful (No at 1016), the operations move to 1020, where it is determined whether or not the frame counter value has exceeded a predetermined threshold number. Upon a determination that the frame counter exceeds the predetermined threshold (Yes at 1020), the detector is reset by returning to 1002. If the frame counter has not exceeded the predetermined threshold (No at 1020), the operations return to 1012 to accumulate the symbol values that are obtained from the next video frame.

Payload Confirmation: Once the payload is extracted from a frame, the detector can anticipate the bit pattern that is expected to occur in the subsequent frame or frames. Generally, subsequent frame is likely to have the same payload as the current frame, and the expected bit pattern can be formed by adding parity bits and possibly header bits to the extracted payload. This expected bit pattern can be compared against the candidate bit pattern that is obtained from extracting watermarks bits from the subsequent frame. If these two patterns are miss-matched in no more than K1 symbols (where K1 is a predetermined threshold that is set based on achieving a particular false detection rate), the presence of the expected pattern is very likely. In one example, where the watermark rate is 240 symbols per frame, K1=90 is used. This value of K1 is associated with a probability of false detection (e.g., probability that a random pattern matches the expected pattern) of less than 0.0001. Note that the matching based on the above criteria is done when the detector is in the confirmation state (i.e., only if the presence of the mark in a frame has been established, as described above).

The second most likely bit pattern can be the bit pattern that is formed by incrementing the payload (e.g., by one). Thus we want to detect this event, i.e., the transition from the previous to a new watermark payload. Since the header pattern and most of the payload bits are the same as the previous watermark payload, one approach is to use the parity bits in order to discriminate between the two patterns. So, if parity bits in the candidate bit pattern (i.e., the bit pattern that is formed based on extraction of watermark bits from the next video frame) match the expected parity bit pattern in at least K2 places, a payload increment detection is declared. For example, in an example where the watermark includes 168 parity bits, a miss-match of no more than K2=50 bits is sufficient to declare that the payload transition event has occurred. Note that, in some embodiments, a payload transition event can override payload confirmation event described above (i.e. if both are present only transition is reported). If payload confirmation in one frame is followed by payload transition detection in the subsequent frame, the payload transition event is flagged to the device. This event can be used by the device to synchronize some other actions with the marked content presentation.

In some embedding scenarios, only J subsequent frames carry a mark, followed by a number of frames with no mark, or with unrecognizable marks (e.g., marks that may be intended for a different detector). In such embedding scenarios, the bit pattern that follows a detected bit pattern is not necessarily known. The disclosed embodiments further include modifications to the above described prediction or confirmation techniques to account for such embedding scenarios. In particular, since it is desirable to know the position of the mark with a single-frame accuracy, the detector tries to establish the presence of the marks in J consecutive frames, surrounded by frames where presence of the marks isn't confirmed. For example, the detector can keep the bit patterns for J+2 consecutive frames, and for each new frame (starting from the transition into confirmation state), the detector checks if the first and the last frame have more than K3 mismatches with the predicted bit pattern, while all other frames have less than K3 mismatches. If this condition is met, the transition event is signaled to the device.

In an alternative embodiment, a bit pattern transition is created as part of the embedding operations at a particular position within the J frames. For example, the initial J−1 frames can be embedded so they carry identical bit patterns, and the $J^{th}$ frame can be embedded using a different, but a predefined bit pattern. For example, the $J^{th}$ frame can have all of its bits inverted, or have only a subset of its bits inverted (e.g., in order to reduce visual artefacts). Under this embedding scheme, the detection of the transition is facilitated since the detector knows, in advance, which of the detected bits are expected to be inverted, and can use this knowledge to detect the $J^{th}$ frame that signals the transition event.

Once a transition event is reported to the device, the detector may choose to skip pattern prediction and matching operations for a predefined number of subsequent frames, and resume those operations later while still remaining in the confirmation state.

If neither a payload confirmation, nor a payload transition are detected in a frame, but the detector has determined a watermark is present, then the detector can move to the extraction state to attempt to extract an unknown payload. If the extraction of the new payload is successful, the detector reports this event to the device and starts the confirmation process using the new payload.

If none of the above events (payload confirmation, payload transition, or new payload detection) happens in N consecutive attempts, the detector waits for a predefined period of time to attempt to recover the payloads again. For example, the payload embedding protocol may call for embedding of marks in J consecutive frames with groups of J frames that are spaced T seconds apart, say T=1.5 seconds, and that each subsequent group of J frames has a particular payload field that is incremented by one compared to the previous group of J frames. Using this embedding scheme, when the detector confirms the presence of a first group of J frames with a known payload, it can predict the next payload based on the assumption that the particular payload field is incremented by one, and such a predicted next payload is located at a position within the content that it T seconds apart from the first group of frames. In this new (e.g., second) group of J frames, the detector can create a candidate symbol pattern from the extracted symbols, and compare it to the predicted template. If the match is sufficiently good, e.g., if out of 240 symbols, no more than 90 mismatches are found, the prediction is deemed successful, and the detector continues to operate in the confirmation mode.

Yet, if the prediction is not successful, the detector may attempt to predict if the new symbol pattern matches the old one. This situation may arise if the user has pressed the pause button, which causes the same frame to be displayed until the pause button is released. In this case, the predicted pattern is compared to the candidate pattern found in the first group of frames, and if a mismatch value is sufficiently low, e.g., less than 90 symbols out of 240 symbols, the match is detected and the detector remains in the confirmation state.

If none of above prediction attempts are successful, the detector can signal that linear content consumption has been disturbed. Such disruptions can be caused by e.g., changing the content (channel switching) or making skips within the content. In this situation, the detector can report a "content segment end," and move to the payload "extraction" mode described earlier.

One aspect of the disclosed technology relates to a method for detecting of a video watermark from a multimedia content that includes obtaining a first content segment from a first video frame at a watermark extractor that is implemented at least partially in hardware, and entering an extraction state for determining whether or not one or more watermarks can be extracted from the first content segment. Determining whether or not the one or more watermarks can be extracted from the first content segment includes conducting watermark extraction operations to determine whether or not a first watermark payload can be extracted, and upon a determination that the first watermark payload is extracted, entering a confirmation state for confirming a detection of a second watermark from a second content segment located within a second video frame. Confirming the detection of the second watermark includes processing the second content segment to obtain a set of candidate payload symbols, and determining whether or not the set of candidate payload symbols match an expected set of payload symbols with less than a predetermined number of mismatches. The expected set of payload symbols can be a predicted sequence of payload symbols that are formed based on the first watermark payload. Confirming the detection of the second watermark further includes upon a determination that the set of candidate payload symbols match the expected set of payload symbols with less than a predetermined number of mismatches, producing an indication that a payload of the second watermark has been detected.

In one exemplary embodiment, the above noted method further includes, upon entering the extraction state and prior to conducting watermark extraction operations to determine whether or not the first watermark payload can be extracted, determining whether or not the first watermark is present in the first video frame without making a determination of the payload value of the first watermark, and only upon a determination that the first watermark is present, conducting watermark extraction operations to determine whether or not the first watermark payload can be extracted. In another exemplary embodiment, the above method further includes, upon entering the confirmation state and prior to processing the second content segment to obtain the set of candidate payload symbols, processing the second content segment from the second video frame to determine whether or not the second watermark is present without making a determination of the payload of the second watermark, and only upon a determination that the second watermark is present, processing the second content segment to obtain the set of candidate payload symbols.

In another exemplary embodiment, upon a determination that the first watermark payload cannot be extracted from the first content segment, the above noted method includes, for each symbol location of the first watermark payload, storing a luma value that is obtained from conducting the watermark extraction for the symbol location, processing the second content segment from the second video frame to obtain a luma value for each symbol of the second watermark payload, and for each symbol location, producing an accumulated luma value by adding the luma value obtained from the second content segment to the stored luma value for the symbol location. Subsequently, for each symbol location, comparing the accumulated luma value to a predetermined threshold value to obtain a candidate symbol value, forming a candidate payload pattern based on the candidate symbol values, performing a forward error correction operation on the candidate payload pattern, and upon a determination that the forward error correction operation is successful, producing an indication that the first watermark payload has been successfully extracted.

In one exemplary embodiment, comparing the accumulated luma value to a predetermined threshold includes comparing the accumulated luma value of each symbol location to a product Fc*T, where Fc represents a number of video frames that have been processed by the watermark extractor without obtaining a successful detection of the first watermark payload, and T represents a predetermined threshold value for mapping a detected luma value from a single video frame to a particular symbol value. In still another exemplary embodiment, comparing the accumulated luma value to a predetermined threshold includes, for each symbol location, dividing the accumulated luma value by Fc, and then comparing the result to T.

According to another exemplary embodiment, upon a determination that the forward error correction is not successful, the above note method includes processing one or more additional content segments from one or more additional video frames, respectively, and producing the accumulated luma value by adding the luma values obtained from the one or more additional content segments to the stored luma values for each symbol location. Subsequently, for each symbol location, comparing the accumulated luma value to the predetermined threshold value to obtain a new candidate symbol value, forming a new candidate payload pattern based on the new candidate symbol values, performing a forward error correction operation on the new candidate payload pattern, and upon a determination that the forward error correction operation is successful, producing the indication that the first watermark payload has been successfully extracted.

In another exemplary embodiment, prior to producing the accumulated luma value by adding the luma values obtained from the one or more additional content segments, the above method further includes determining whether or not a number video frames that have been processed by the watermark extractor without obtaining a successful detection of the first watermark payload exceeds a predetermined frame count, and upon an affirmative determination, initializing both the accumulated luma values and the number of video frames that have been processed by the watermark extractor without obtaining a successful detection of the first watermark payload.

In one exemplary embodiment, upon a determination that the first watermark payload cannot be extracted from the first content segment, the above method includes, for each symbol location of the first watermark payload, assigning a candidate symbol value and storing the candidate symbol value in a bit-sum vector, and processing the second content segment from the second video frame to obtain a candidate symbol value for each symbol of the second watermark payload. Subsequently, for each symbol location, producing an accumulated symbol value by adding the candidate symbol value obtained from the second content segment to the stored symbol value in the bit-sum vector for the symbol location, for each symbol location, producing an estimated symbol value based on the accumulated symbol value, forming a candidate payload pattern based on the estimated symbol values, performing a forward error correction operation on the candidate payload pattern, and upon a determination that the forward error correction is successful, producing an indication that the first watermark payload has been successfully extracted.

In another exemplary embodiment, the above noted method further includes, upon a determination that the first watermark payload cannot be extracted from the first content segment, for each symbol location of the first watermark payload, assigning a candidate symbol value and storing the candidate symbol value in a bit-sum vector, processing the second content segment from the second video frame to obtain a candidate symbol value for each symbol of the second watermark payload, and processing a third content segment from a third video frame to obtain a candidate symbol value for each symbol of a third watermark payload. This method further includes, for each symbol location, producing an accumulated symbol value by adding the candidate symbol value obtained from the second content segment and the third content segment to the stored symbol value in the bit-sum vector for the symbol location, for each symbol location, producing a new estimated symbol value based on the accumulated symbol value, forming a new candidate payload pattern based on the new estimated symbol values, performing a forward error correction operation on the new candidate payload pattern, and upon a determination that the forward error correction operation is successful, producing an indication that the first watermark payload has been successfully extracted.

In one exemplary embodiment, the symbols of the first and the second watermark payloads are binary symbols, and producing the accumulated symbol value for each symbol location includes adding the candidate symbol value obtained from the second content segment to the stored symbol value in the bit-sum vector only for candidate symbols that are detected from the second content segment as having a value of one. In another exemplary embodiment, producing the estimated symbol value based on the accumulated symbol value includes producing a value of one as the estimated symbol value upon a determination that the accumulated symbol value exceeds Fc/2, where Fc represents a number of video frames that have been processed by the watermark extractor without obtaining a successful detection of the first watermark payload.

In yet another exemplary embodiment, the expected set of payload symbols are formed based on a prediction that a value of the payload of the second watermark has changed to a new value compared to a value of the payload of the first watermark. In another exemplary embodiment, the second watermark includes parity symbols formed based on an error correction code or an error detection code. In this embodiment, determining whether or not the set of candidate payload symbols match the expected set of payload symbols with less than a predetermined number of mismatches includes forming a predicted parity symbol pattern based on the new value, comparing the predicted parity symbol pattern to a candidate parity symbol pattern obtained from the processing of the second content segment, and upon a determination that a number mismatches between the predicted parity symbol pattern and the candidate parity symbol pattern is less than a predetermined threshold, producing the indication that a payload of the second watermark has been detected.

According to another exemplary embodiment, the above noted method further includes, upon entering the confirmation state, forming an additional set of expected payload symbols based on a prediction that a value of the payload of the second watermark has changed to a new value compared to a value of the payload of the first watermark, where the expected set of payload symbols are formed based on a prediction that the payload of the second watermark remains the same as the payload of the first watermark. Further, upon a determination that the candidate payload symbols match both the expected set of payload symbols and the additional set of expected payload symbols with less than the predetermined number of mismatches, designating the additional set of expected payload symbols as the detected payload of the second watermark.

Another aspect of the disclosed technology relates to a method for detecting a video watermark from a plurality of video frames that includes processing, at a watermark extractor that is implemented at least partially in hardware, a first segment of a first video frame to determine whether or not a payload of a first watermark comprising a plurality of watermark symbols can be extracted from the first segment. Upon a determination that the payload of the first watermark cannot be extracted, this method further includes storing a luma value associated with each of the symbols of the first watermark, processing a second segment from a second video frame to obtain a luma value for each symbol of a second watermark payload, and for each symbol location, producing an accumulated luma value by adding a luma value obtained from the second segment to the stored luma value for the symbol location. Further, the method includes, for each symbol location, comparing the accumulated luma value to a predetermined threshold value to obtain a candidate symbol value, forming a candidate payload pattern based on the candidate symbol values, performing a forward error correction operation on the candidate payload pattern, and upon a determination that the forward error correction is successful, producing an indication that the first watermark payload has been successfully extracted.

Another aspect of the disclosed embodiments relates to another method for detecting a video watermark from a plurality of video frames that includes processing, at a watermark extractor that is implemented at least partially in hardware, a first segment of a first video frame to determine whether or not a payload of a first watermark comprising a plurality of watermark symbols can be extracted from the first segment. Upon a determination that the payload of the first watermark cannot be extracted, the method includes, for each symbol location of the first watermark payload, assigning a candidate symbol value and storing the candidate symbol value in a bit-sum vector, and processing one or more additional a second content segment from a second video frame to obtain a candidate symbol value for each symbol of a second watermark payload. The method also includes, for each symbol location, producing an accumulated symbol value by adding the candidate symbol value obtained from the second content segment to the stored symbol value in the bit-sum vector for the symbol location and, for each symbol location, producing an estimated symbol value based on the accumulated symbol value. The method further includes forming a candidate payload pattern based on the estimated symbol values, performing a forward error correction operation on the candidate payload pattern, and upon a determination that the forward error correction is successful, producing an indication that the first watermark payload has been successfully extracted.

Another aspect of the disclosed embodiments relates to a device that includes a processor, and a memory including processor executable code. The processor executable code, upon execution by the processor, causes the device to obtain a first content segment from a first video frame at a watermark extractor, enter an extraction state to determine whether or not one or more watermarks can be extracted from the first content segment causing the device to conduct watermark extraction operations to determine whether or not a first watermark payload can be extracted, and upon a determination that the first watermark payload is extracted, enter a confirmation state to confirm a detection of a second watermark from a second content segment located within a second video frame by causing the device to process the second content segment to obtain a set of candidate payload symbols, and determine whether or not the set of candidate payload symbols match an expected set of payload symbols with less than a predetermined number of mismatches, where the expected set of payload symbols is a predicted sequence of payload symbols that are formed based on the first watermark payload; upon a determination that the set of candidate payload symbols match the expected set of payload symbols with less than a predetermined number of mismatches, produce an indication that a payload of the second watermark has been detected.

In one exemplary embodiment, the processor executable code, upon execution by the processor, further causes the device to, upon entering the extraction state and prior to conducting watermark extraction operations to determine whether or not the first watermark payload can be extracted, determine whether or not the first watermark is present in the first video frame without making a determination of the payload value of the first watermark, and only upon a determination that the first watermark is present, conduct watermark extraction operations to determine whether or not the first watermark payload can be extracted. In another exemplary embodiment, the processor executable code, upon execution by the processor, further causes the device to upon entering the confirmation state and prior to processing the second content segment to obtain the set of candidate payload symbols, process the second content segment from the second video frame to determine whether or not the second watermark is present without making a determination of the payload of the second watermark, and only upon a determination that the second watermark is present, process the second content segment to obtain the set of candidate payload symbols.

In still another exemplary embodiment, the processor executable code, upon execution by the processor, causes the device to upon a determination that the first watermark payload cannot be extracted from the first content segment, for each symbol location of the first watermark payload, store a luma value that is obtained from conducting the watermark extraction for the symbol location, and process the second content segment from the second video frame to obtain a luma value for each symbol of the second watermark payload. Further, for each symbol location, produce an accumulated luma value by adding the luma value obtained from the second content segment to the stored luma value for the symbol location, and further, for each symbol location, compare the accumulated luma value to a predetermined threshold value to obtain a candidate symbol value, form a candidate payload pattern based on the candidate symbol values, perform a forward error correction operation on the candidate payload pattern, and upon a determination that the forward error correction is successful, produce an indication that the first watermark payload has been successfully extracted.

In yet another exemplary embodiment, the processor executable code, upon execution by the processor, causes the device to compare the accumulated luma value to a predetermined threshold by comparing the accumulated luma value of each symbol location to a product Fc*T, where Fc represents a number of video frames that have been processed by the watermark extractor without obtaining a successful detection of the first watermark payload, and T represent a predetermined threshold value for mapping a detected luma value from a single video frame to a particular symbol value. In another exemplary embodiment, the processor executable code, upon execution by the processor, causes the device to compare the accumulated luma value to a predetermined threshold by, for each symbol location, dividing the accumulated luma value by Fc, and then comparing the result to T.

According to another exemplary embodiment, the processor executable code, upon execution by the processor, causes the device to, upon a determination that the forward error correction is not successful, process one or more additional content segments from one or more additional video frames, respectively and to produce the accumulated luma value by adding the luma values obtained from the one or more additional content segments to the stored luma values for each symbol location. Further, for each symbol location, compare the accumulated luma value to the predetermined threshold value to obtain a new candidate symbol value, form a new candidate payload pattern based on the new candidate symbol values, perform a forward error correction operation on the new candidate payload pattern; and upon a determination that the forward error correction operation is successful, produce the indication that the first watermark payload has been successfully extracted.

In one exemplary embodiment, the processor executable code, upon execution by the processor, causes the device to, prior to producing the accumulated luma value by adding the luma values obtained from the one or more additional content segments, determine whether or not a number video frames that have been processed by the watermark extractor without obtaining a successful detection of the first watermark payload exceeds a predetermined frame count, and upon an affirmative determination, initialize both the accumulated luma values and the number of video frames that have been processed by the watermark extractor without obtaining a successful detection of the first watermark payload.

In another exemplary embodiment, the processor executable code, upon execution by the processor, causes the device to, upon a determination that the first watermark payload cannot be extracted from the first content segment, for each symbol location of the first watermark payload, assign a candidate symbol value and store the candidate symbol value in a bit-sum vector, and process the second content segment from the second video frame to obtain a candidate symbol value for each symbol of the second watermark payload. Further, for each symbol location, produce an accumulated symbol value by adding the candidate symbol value obtained from the second content segment to the stored symbol value in the bit-sum vector for the symbol location, and for each symbol location, produce an estimated symbol value based on the accumulated symbol value. Additionally, form a candidate payload pattern based on the estimated symbol values, perform a forward error correction operation on the candidate payload pattern, and upon a determination that the forward error correction operation is successful, produce an indication that the first watermark payload has been successfully extracted.

In one exemplary embodiment, the processor executable code, upon execution by the processor, further causes the device to, upon a determination that the first watermark payload cannot be extracted from the first content segment, for each symbol location of the first watermark payload, assign a candidate symbol value and store the candidate symbol value in a bit-sum vector, process the second content segment from the second video frame to obtain a candidate symbol value for each symbol of the second watermark payload and process a third content segment from a third video frame to obtain a candidate symbol value for each symbol of a third watermark payload. Further, for each symbol location, produce the accumulated symbol value by adding the candidate symbol value obtained from the second content segment and the third content segment to the stored symbol value in the bit-sum vector for the symbol location, and for each symbol location, produce a new estimated symbol value based on the accumulated symbol value. Subsequently, form a new candidate payload pattern based on the new estimated symbol values, perform a forward error correction operation on the new candidate payload pattern, and upon a determination that the forward error correction operation is successful, produce an indication that the first watermark payload has been successfully extracted.

In yet another exemplary embodiment, the symbols of the first and the second watermark payloads are binary symbols, and the accumulated symbol value for each symbol location is produced by adding the candidate symbol value obtained from the second content segment to the stored symbol value in the bit-sum vector only for candidate symbols that are detected from the second content segment as having a value of one. In still another exemplary embodiment, the processor executable code, upon execution by the processor, causes the device to produce the estimated symbol value based on the accumulated symbol value by producing a value of one as the estimated symbol value upon a determination that the accumulated symbol value exceeds Fc/2, where Fc represents a number of video frames that have been processed by the watermark extractor without obtaining a successful detection of the first watermark payload.

In another exemplary embodiment, the expected set of payload symbols are formed based on a prediction that a value of the payload of the second watermark has changed to a new value compared to a value of the payload of the first watermark. In this embodiment, the second watermark includes parity symbols formed based on an error correction code or an error detection code. Further, the processor executable code, upon execution by the processor, causes the device to determine whether or not the set of candidate payload symbols match the expected set of payload symbols with less than a predetermined number of mismatches that comprises forming a predicted parity symbol pattern based on the new value, comparing the predicted parity symbol pattern to a candidate parity symbol pattern obtained from the processing of the second content segment, upon a determination that a number mismatches between the predicted parity symbol pattern and the candidate parity symbol pattern is less than a predetermined threshold, producing the indication that a payload of the second watermark has been detected.

According to one exemplary embodiment, the processor executable code, upon execution by the processor, further causes the device to, upon entering the confirmation state, form an additional set of expected payload symbols based on a prediction that a value of the payload of the second watermark has changed to a new value compared to a value of the payload of the first watermark, where the expected set of payload symbols are formed based on a prediction that the payload of the second watermark remains the same as the payload of the first watermark. In this embodiment, upon a determination that both the candidate payload symbols match both the expected set of payload symbols and the additional set of expected payload symbols with less than the predetermined number of mismatches, the processor executable code, upon execution by the processor, further causes the device to, designate the additional set of expected payload symbols as the detected payload of the second watermark.

Another aspect of the disclosed embodiments relates to a device that includes a processor and a memory comprising processor executable code. The processor executable code, upon execution by the processor, causes the device to process a first segment of a first video frame to determine whether or not a payload of a first watermark comprising a plurality of watermark symbols can be extracted from the first segment, and upon a determination that the payload of the first watermark cannot be extracted, store a luma value associated with each of the symbols of the first watermark, and process a second segment from a second video frame to obtain a luma value for each symbol of a second watermark payload. Further, for each symbol location, produce an accumulated luma value by adding a luma value obtained from the second segment to the stored luma value for the symbol location, and for each symbol location, compare the accumulated luma value to a predetermined threshold value to obtain a candidate symbol value. Additionally, form a candidate payload pattern based on the candidate symbol values, perform a forward error correction operation on the candidate payload pattern, and upon a determination that the forward error correction operation is successful, producing an indication that the first watermark payload has been successfully extracted.

Another aspect of the disclosed embodiments relates to a device that includes a processor and a memory comprising processor executable code. The processor executable code, upon execution by the processor causes the device to process a first segment of a first video frame to determine whether or not a payload of a first watermark comprising a plurality of watermark symbols can be extracted from the first segment, and upon a determination that the payload of the first watermark cannot be extracted conduct the following. For each symbol location of the first watermark payload, assign a candidate symbol value and store the candidate symbol value in a bit-sum vector, and process a second content segment from a second video frame to obtain a candidate symbol value for each symbol of a second watermark payload. Further, for each symbol location, produce an accumulated symbol value by adding the candidate symbol value obtained from the second content segment to the stored symbol value in the bit-sum vector for the symbol location, and for each symbol location, produce an estimated symbol value based on the accumulated symbol value. Additionally, form a candidate payload pattern based on the estimated symbol values, perform a forward error correction operation on the candidate payload pattern, and upon a determination that the forward error correction operation is successful, produce an indication that the first watermark payload has been successfully extracted.

Another aspect of the disclosed embodiments relates to a computer program product, embodied on one or more non-transitory computer readable media, that includes program code for obtaining a first content segment from a first video frame at a watermark extractor that is implemented at least partially in hardware, and program code for entering an extraction state for determining whether or not one or more watermarks can be extracted from the first content segment. Determining whether or not the one or more watermarks can be extracted from the first content segment comprises conducting watermark extraction operations to determine whether or not a first watermark payload can be extracted, upon a determination that the first watermark payload is extracted, entering a confirmation state for confirming a detection of a second watermark from a second content segment located within a second video frame. Confirming the detection of the second watermark includes processing the second content segment to obtain a set of candidate payload symbols, and determining whether or not the set of candidate payload symbols match an expected set of payload symbols with less than a predetermined number of mismatches, where the expected set of payload symbols is a predicted sequence of payload symbols that are formed based on the first watermark payload. Further upon a determination that the set of candidate payload symbols match the expected set of payload symbols with less than a predetermined number of mismatches, producing an indication that a payload of the second watermark has been detected.

In some embodiments, a method of detecting a video watermark is describes that includes receiving content having a video watermark using a detector having at least two states, extraction and confirmation. In one exemplary embodiment, this method further includes prior to attempting to extract payload from the video watermark and prior to confirming a payload presence, making a decision regarding whether a watermark is present or not. In some embodiments, the method also includes making a decision regarding whether a video watermark is present or not by counting how many symbols have luma values outside a predefined range. In yet another embodiment, the method further includes, if a video watermark is present, the detector forming a candidate bit pattern by comparing average luma values per symbol with a predicted threshold T. In still another exemplary embodiment, the method also includes confirming presence of a header, and attempting to extract payload using a Forward Error Correction decoder.

In yet another exemplary embodiment, the above noted method also includes determining that the extraction is successful, determining that the number of bits in error is below a threshold, reporting a payload, and moving the detector to the confirmation state. In another exemplary embodiment, the method further includes determining that the extraction is not successful, and proceeding with multi-frame extraction using a luma-sum routine. In one exemplary embodiment, the method further includes determining that the extraction is not successful, and proceeding with multi-frame extraction using bit-sum routine. In another exemplary embodiment, the method further includes completing payload extraction, and determining an expected bit pattern in subsequent video frames by adding parity bits to the extracted payload. In another exemplary embodiment, the method further includes matching the expected bit pattern to a candidate bit pattern found the subsequent video frame.

Figure 11:
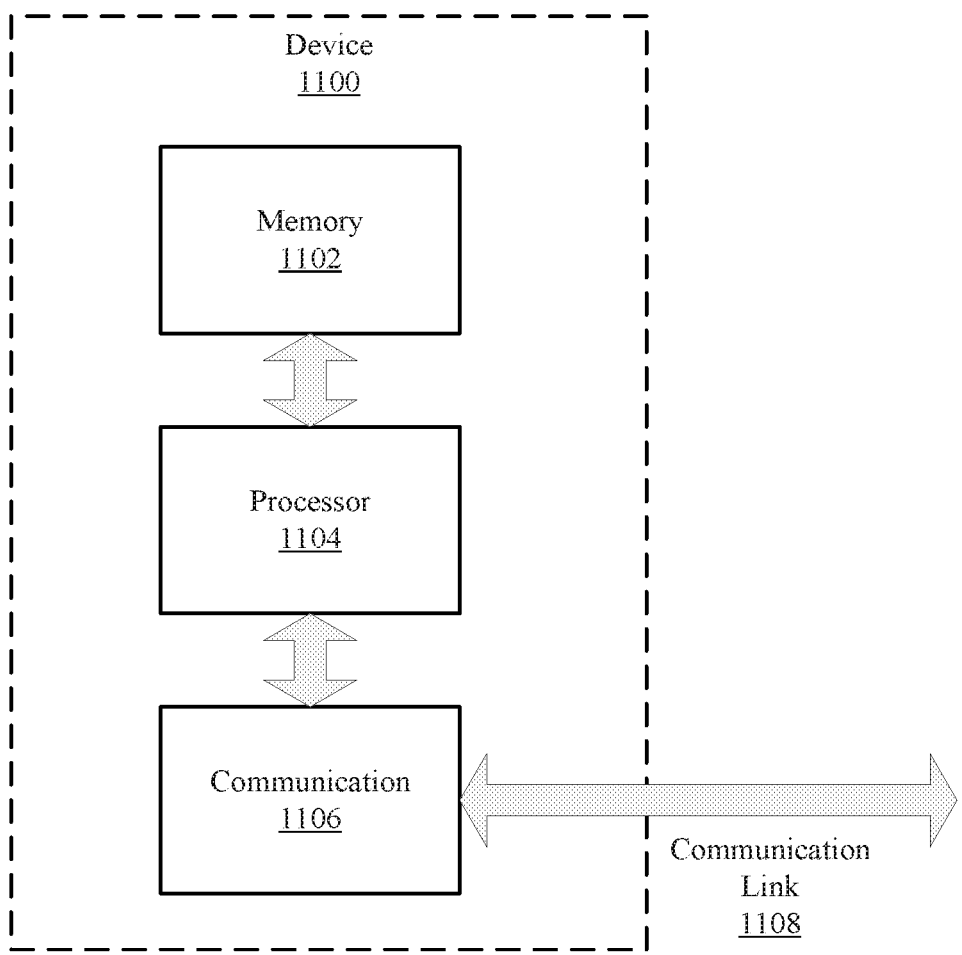
FIG. 11 illustrates a block diagram of an exemplary device that can be used for implementing some of the disclosed embodiments.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 11 illustrates a block diagram of a device 1100 within which the various disclosed embodiments may be implemented. The device 1100 comprises at least one processor 1102 and/or controller, at least one memory 1104 unit that is in communication with the processor 1102, and at least one communication unit 1106 that enables the exchange of data and information, directly or indirectly, through the communication link 1108 with other entities, devices and networks. The communication unit 1106 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

The disclosed devices or modules can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. For example, in some implementations, the described operations can be conducted in a different order. The features of the embodiments described herein may be combined in all possible combinations of methods, apparatus, modules, systems, and computer program products.

What is claimed is:

1. A method for enabling acquisition of metadata associated with a multimedia content based on detection of a video watermark from the multimedia content, the method comprising:
obtaining, at a watermark extractor that is implemented at least partially in hardware, one or more blocks of sample values representing image pixels in a video frame of the multimedia content, each block including one or more rows of pixel values and one or more columns of pixel values; and
using the watermark extractor to extract one or more video watermarks from the one or more blocks, including:
for each block:
(a) determining a weighted sum of the pixel values in the block produced by multiplying each pixel value with a particular weight coefficient and summing the result together, wherein the particular weight coefficients for each block are selected to at least partially compensate for degradation of video watermark or watermarks in each block due to impairments caused by transmission or processing of the multimedia content;
(b) comparing the weighted sum of the pixel values to one or more predetermined threshold values;
(c) upon a determination that the weighted sum falls within a first range of the one or more predetermined threshold values, identifying a detected watermark symbol having a first value; and
(d) upon a determination that the weighted sum falls within a second range of the one or more predetermined threshold values, identifying a detected watermark symbol having a second value;
repeating operations (a) through (d) for a plurality of the one or more blocks to obtain a plurality of the detected watermark symbol values;
determining whether or not the plurality of the detected watermark symbols values form a valid watermark payload; and
upon a determination that a valid watermark payload has been detected, acquiring the metadata associated with the multimedia content based on the valid watermark payload.

2. The method of claim 1, wherein, for each block, the particular coefficients that are positioned closer to the center of the block are assigned a higher weight value than the particular coefficients that are positioned closer to the edge of the block.

3. The method of claim 1, wherein:
the one or more predetermined threshold values include a low range, a high range and a mid range value,
the detected watermark symbol is identified as having the first value upon a determination that the weighted sum has a value between the mid range and low range of values, and
the detected watermark symbol is identified as having the second value upon a determination that the weighted sum has a value between the mid range and high range of values.

4. The method of claim 1, wherein:
the one or more predetermined threshold values include a mid range value,
the detected watermark symbol is identified as having the first value upon a determination that the weighted sum has a value lower than the mid range value, and
the detected watermark symbol is identified as having the second value upon a determination that the weighted sum has a value larger than the mid range value.

5. The method of claim 1, wherein the weighted sum includes a weighted sum of luma values.

6. The method of claim 1, wherein the weighted sum includes a normalized sum obtained by dividing the weighted sum by the sum of pixel values in the block.

7. The method of claim 1, wherein determining whether or not the plurality of the detected watermark symbols values form a valid watermark payload includes performing an error correction code decoding to determine whether or not the plurality of detected watermark symbols form a valid codeword of the error correction code.

8. The method of claim 1, wherein determining whether or not the plurality of the detected watermark symbols values form a valid watermark payload includes comparing the plurality of the detected watermark symbols to a predefined pattern of symbols, and identifying that the plurality of detected watermark symbols form a valid watermark payload upon a determination that a number of mismatches between the predefined pattern and the detected plurality of watermark symbols is below a particular threshold.

9. The method of claim 1, wherein upon a failure to detect a valid watermark payload:
determining a new weighted sum of the pixel values in the block by multiplying each pixel value with a new weight coefficient;
repeating operations (b) through (c) using the new weighted sum for each of the one or more blocks to obtain the plurality of the detected watermark symbols values; and
repeating the determining as to whether or not the plurality of the detected watermark symbols values form a valid watermark payload.

10. The method of claim 1, further comprising:
prior to operation (a), scaling luma values of the pixel values in the block by multiplying each pixel value in the block with a corresponding scaling factor to provide scaled luma values within the block that are substantially uniform.

11. The method of claim 10, wherein determining the weighted sum includes determining an average luma value according to:

$$\text{Average Luma} = \sum \frac{\min(l_{ij} * s, M)}{\text{Max\_i} * \text{Max\_j}},$$

for $1 \leq i \leq \text{Max\_i}$ and $1 \leq j \leq \text{Max\_j}$, where i and j denote a row and column, respectively, in each block having Max_i rows and Max_j columns, $l_{ij}$ is the luma value for the pixel in i-th row and j-th column, M is the maximum luma range of each pixel, and S is a scaling factor.

12. The method of claim 1, further comprising:
obtaining one or more additional blocks of sample values, each of the one or more additional blocks representing image pixels in one or more additional video frames, respectively, and producing a new sum based on cumulative pixel values of the one or more blocks.

13. The method of claim 12, wherein:
the new sum is produced by combining luma values of pixels corresponding to each of the one or more additional blocks with the weighted sum that is produced in operation (a); and
performing the remaining operations for determining whether or not the plurality of the detected watermark symbols values form a valid watermark payload using the new sum.

14. The method of claim 1, wherein upon a determination that the plurality of the detected watermark symbols values do not form a valid watermark payload:
for each block, storing a luma value obtained for that block;
processing one or more blocks associated form one or more video frames, respectively, to obtain one or more additional luma values for that block;
for each block, producing an accumulated luma value by adding the one or more additional luma values to the stored luma value;
for each block, comparing the accumulated luma value to a particular threshold value to obtain a candidate symbol value;
forming a candidate payload pattern based on the candidate symbol values;
performing a forward error correction operation on the candidate payload pattern; and
upon a determination that the forward error correction operation is successful, producing an indication that a watermark payload has been successfully extracted.

15. The method of claim 14, wherein comparing the accumulated luma value to a particular threshold includes comparing the accumulated luma value of each block to a product Fc*T, where Fc represents a number of video frames that have been processed by the watermark extractor without obtaining a valid watermark payload, and T represents a predetermined threshold value for mapping a detected luma value from a single video frame to a particular symbol value.

16. The method of claim 14, wherein comparing the accumulated luma value to a particular threshold includes, for each block, dividing the accumulated luma value by Fc, and then comparing the result to T, where Fc represents a number of video frames that have been processed by the watermark extractor without obtaining a valid watermark payload, and T represents a predetermined threshold value for mapping a detected luma value from a single video frame to a particular symbol value.

17. The method of claim 1, wherein upon a determination that the plurality of the detected watermark symbols values do not form a valid watermark payload:
   for each block, storing the detected watermark symbol value in a bit-sum vector;
   processing one or more blocks associated form one or more video frames, respectively, to obtain one or more additional watermark symbol values for each block;
   for each block, producing an accumulated symbol value by adding the one or more additional watermark symbol values to the stored watermark symbol value in the bit-sum vector;
   for each block, producing an estimated symbol value based on the accumulated symbol value;
   forming a candidate payload pattern based on the estimated symbol values;
   performing a forward error correction operation on the candidate payload pattern; and
   upon a determination that the forward error correction is successful, producing an indication that a valid watermark payload has been successfully extracted.

18. The method of claim 17, wherein
   the symbols of the watermark symbols are binary symbols, and
   producing the accumulated symbol value for block includes adding the one or more watermark symbols values to the stored symbol value in the bit-sum vector only for watermark symbols that are detected as having a value of one.

19. The method of claim 18, wherein producing the estimated symbol value includes producing a value of one as the estimated symbol value upon a determination that the accumulated symbol value exceeds Fc/2, where Fc represents a number of video frames that have been processed by the watermark extractor without obtaining a valid watermark payload.

20. A device, comprising:
   a processor; and
   a memory including processor executable code, wherein the processor executable code, when executed by the processor, causes the device to:
   obtain, at a watermark extractor, one or more blocks of sample values representing image pixels in a video frame of a multimedia content, each block including one or more rows of pixel values and one or more columns of pixel values; and
   use the watermark extractor to extract one or more video watermarks from the one or more blocks, including:
   for each block:
     (a) determine a weighted sum of the pixel values in the block produced by multiplying each pixel value with a particular weight coefficient and summing the result together, wherein the particular weight coefficients for each block are selected to at least partially compensate for degradation of video watermark or watermarks in each block due to impairments caused by transmission or processing of the multimedia content;
     (b) compare the weighted sum of the pixel values to one or more predetermined threshold values;
     (c) upon a determination that the weighted sum falls within a first range of the one or more predetermined threshold values, identify a detected watermark symbol having a first value; and
     (d) upon a determination that the weighted sum falls within a second range of the one or more predetermined threshold values, identify a detected watermark symbol having a second value;
   repeat items (a) through (d) for a plurality of the one or more blocks to obtain a plurality of the detected watermark symbol values; and
   determine whether or not the plurality of the detected watermark symbols values form a valid watermark payload; and
   upon a determination of that a valid watermark payload has been detected, acquire metadata associated with the multimedia content based on the valid watermark payload.

21. The device of claim 20, wherein, for each block, the particular coefficients that are positioned closer to the center of the block are assigned a higher weight value than the particular coefficients that are positioned closer to the edge of the block.

22. The device of claim 20, wherein:
   the one or more predetermined threshold values include a low range, a high range and a mid range value, and
   the processor executable code, when executed by the processor, causes the device to:
   identify the detected watermark symbol as having the first value upon a determination that the weighted sum has a value between the mid range and low range of values, and
   identify the detected watermark symbol as having the second value upon a determination that the weighted sum has a value between the mid range and high range of values.

23. The device of claim 20, wherein:
   the one or more predetermined threshold values include a mid range value, and
   the processor executable code, when executed by the processor, causes the device to:
   identify the detected watermark symbol as having the first value upon a determination that the weighted sum has a value lower than the mid range value, and
   identify the detected watermark symbol as having the second value upon a determination that the weighted sum has a value larger than the mid range value.

24. The device of claim 20, wherein the weighted sum includes a weighted sum of luma values.

25. The device of claim 20, wherein the weighted sum includes a normalized sum obtained by dividing the weighted sum by the sum of pixel values in the block.

26. The device of claim 20, wherein, the processor executable code, when executed by the processor, causes the device to determine whether or not the plurality of the detected watermark symbols values form a valid watermark payload by performing an error correction code decoding to determine whether or not the plurality of detected watermark symbols form a valid codeword of the error correction code.

27. The device of claim 20, wherein, the processor executable code, when executed by the processor, causes the device to determine whether or not the plurality of the detected watermark symbols values form a valid watermark payload by comparing the plurality of the detected watermark symbols to a predefined pattern of symbols, and identifying that the plurality of detected watermark symbols form a valid watermark payload upon a determination that a number of mismatches between the predefined pattern and the detected plurality of watermark symbols is below a particular threshold.

28. The device of claim 20, wherein the processor executable code, when executed by the processor, causes the device to, upon a failure to detect a valid watermark payload:
determine a new weighted sum of the pixel values in the block by multiplying each pixel value with a new weight coefficient;
repeat operations (b) through (c) using the new weighted sum for each of the one or more blocks to obtain the plurality of the detected watermark symbols values; and
repeat the determination as to whether or not the plurality of the detected watermark symbols values form a valid watermark payload.

29. The device of claim 20, wherein the processor executable code, when executed by the processor, further causes the device to:
prior to operation (a), scale luma values of the pixel values in the block by multiplying each pixel value in the block with a corresponding scaling factor to provide scaled luma values within the block that are substantially uniform.

30. The device of claim 29, wherein determination of the weighted sum includes determination of an average luma value according to:

$$\text{Average Luma} = \sum \frac{\min(l_{ij} * s, M)}{\text{Max\_i} * \text{Max\_j}},$$

for $1 \leq i \leq \text{Max\_i}$ and $1 \leq j \leq \text{Max\_j}$, where i and j denote a row and column, respectively, in each block having Max_i rows and Max_j columns, $l_{ij}$ is the luma value for the pixel in i-th row and j-th column, M is the maximum luma range of each pixel, and S is a scaling factor.

31. The device of claim 20, wherein the processor executable code, when executed by the processor, further causes the device to:
obtain one or more additional blocks of sample values, each of the one or more additional blocks representing image pixels in one or more additional video frames, respectively, and produce a new sum based on cumulative pixel values of the one or more blocks.

32. The device of claim 31, wherein:
the new sum is produced by adding luma values of pixels corresponding to each of the one or more additional blocks to the weighted sum; and
the processor executable code, when executed by the processor, causes the device to use the new sum for performing the remaining operations for determining whether or not the plurality of the detected watermark symbols values form a valid watermark payload.

33. The device of claim 32, wherein the processor executable code, upon execution by the processor, causes the device to compare the accumulated luma value to a particular threshold by comparing the accumulated luma value of each block to a product Fc*T, where Fc represents a number of video frames that have been processed by the watermark extractor without obtaining a valid watermark payload, and T represents a predetermined threshold value for mapping a detected luma value from a single video frame to a particular symbol value.

34. The device of claim 32, wherein the processor executable code, upon execution by the processor, causes the device to compare the accumulated luma value to a particular threshold by, for each block, dividing the accumulated luma value by Fc, and then comparing the result to T, where Fc represents a number of video frames that have been processed by the watermark extractor without obtaining a valid watermark payload, and T represents a predetermined threshold value for mapping a detected luma value from a single video frame to a particular symbol value.

35. The device of claim 20, wherein the processor executable code, upon execution by the processor, causes the device to:
upon a determination that the plurality of the detected watermark symbols values do not form a valid watermark payload:
for each block, store a luma value obtained for that block;
process one or more blocks associated form one or more video frames, respectively, to obtain one or more additional luma values for that block;
for each block, produce an accumulated luma value by adding the one or more additional luma values to the stored luma value;
for each block, compare the accumulated luma value to a particular threshold value to obtain a candidate symbol value;
form a candidate payload pattern based on the candidate symbol values;
perform a forward error correction operation on the candidate payload pattern; and
upon a determination that the forward error correction operation is successful, produce an indication that a watermark payload has been successfully extracted.

36. The device of claim 20, wherein the processor executable code, upon execution by the processor, causes the device to:
upon a determination that the plurality of the detected watermark symbols values do not form a valid watermark payload:
for each block, store the detected watermark symbol value in a bit-sum vector;
process one or more blocks associated form one or more video frames, respectively, to obtain one or more additional watermark symbol values for each block;
for each block, produce an accumulated symbol value by adding the one or more additional watermark symbol values to the stored watermark symbol value in the bit-sum vector;
for each block, produce an estimated symbol value based on the accumulated symbol value;
form a candidate payload pattern based on the estimated symbol values;
perform a forward error correction operation on the candidate payload pattern; and
upon a determination that the forward error correction is successful, produce an indication that a valid watermark payload has been successfully extracted.

37. The device of claim 36, wherein
the symbols of the watermark symbols are binary symbols, and
the accumulated symbol value for block is produced by includes adding the one or more watermark symbols values to the stored symbol value in the bit-sum vector only for watermark symbols that are detected as having a value of one.

38. The device of claim 37, wherein the estimated symbol value is generated by producing a value of one as the estimated symbol value upon a determination that the accumulated symbol value exceeds Fc/2, where Fc represents a number of video frames that have been processed by the watermark extractor without obtaining a valid watermark payload.

39. A computer program product, embodied on one or more non-transitory computer readable media, comprising:
program code for obtaining one or more blocks of sample values representing image pixels in a video frame of a multimedia content, each block including one or more rows of pixel values and one or more columns of pixel values; and
program code for extracting one or more video watermarks from the one or more blocks, including:
for each block:
(a) determining a weighted sum of the pixel values in the block produced by multiplying each pixel value with a particular weight coefficient and summing the result together, wherein the particular weight coefficients for each block are selected to at least partially compensate for degradation of video watermark or watermarks in each block due to impairments caused by transmission or processing of the multimedia content;
(b) comparing the weighted sum of the pixel values to one or more predetermined threshold values;
(c) upon a determination that the weighted sum falls within a first range of the one or more predetermined threshold values, identifying a detected watermark symbol having a first value; and
(d) upon a determination that the weighted sum falls within a second range of the one or more predetermined threshold values, identifying a detected watermark symbol having a second value;
program code for repeating operations (a) through (d) for a plurality of the one or more blocks to obtain a plurality of the detected watermark symbol values; and
program code for determining whether or not the plurality of the detected watermark symbols values form a valid watermark payload; and
program code for, upon a determination of that a valid watermark payload has been detected, acquiring meta data associated with the multimedia content based on the valid watermark payload.

* * * * *